United States Patent [19]
Tanaka et al.

[11] Patent Number: 5,999,922
[45] Date of Patent: *Dec. 7, 1999

[54] NEUROPROCESSING SERVICE

[75] Inventors: Takehiko Tanaka; Masayuki Yokono, both of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/451,772

[22] Filed: May 26, 1995

Related U.S. Application Data

[62] Division of application No. 08/351,557, Dec. 7, 1994, Pat. No. 5,708,727, which is a continuation of application No. 08/034,391, Mar. 18, 1993, abandoned.

[30] Foreign Application Priority Data

Mar. 19, 1992  [JP]  Japan ........................................ 4-63784
Mar. 19, 1992  [JP]  Japan ........................................ 4-64017

[51] Int. Cl.$^6$ .................................................. G06F 15/18
[52] U.S. Cl. .......................................................... 706/15
[58] Field of Search ........................... 395/21, 22, 23, 395/24; 382/229, 158, 157; 706/15, 16, 25, 26

[56] References Cited

U.S. PATENT DOCUMENTS

| | | | |
|---|---|---|---|
| 4,876,731 | 10/1989 | Loris et al. | 382/229 |
| 4,893,270 | 1/1990 | Beck et al. | 364/400 |
| 5,048,100 | 9/1991 | Kuperstein | 382/157 |
| 5,052,043 | 9/1991 | Gaborski | 382/157 |
| 5,086,479 | 2/1992 | Takenaga et al. | 382/157 |
| 5,142,665 | 8/1992 | Bigus | 706/44 |
| 5,167,006 | 11/1992 | Furuta et al. | 706/41 |
| 5,210,797 | 5/1993 | Usui et al. | 382/126 |
| 5,214,715 | 5/1993 | Carpenter et al. | 382/157 |
| 5,251,268 | 10/1993 | Colley et al. | 382/156 |
| 5,251,269 | 10/1993 | Korner et al. | 382/158 |
| 5,255,347 | 10/1993 | Matsuba et al. | 395/23 |
| 5,276,771 | 1/1994 | Manukian et al. | 395/24 |
| 5,293,456 | 3/1994 | Guez et al. | 395/24 |
| 5,295,197 | 3/1994 | Takenaga et al. | 382/158 |
| 5,327,522 | 7/1994 | Furuta et al. | 706/43 |
| 5,333,241 | 7/1994 | Furuta et al. | 706/25 |
| 5,402,519 | 3/1995 | Inoue et al. | 395/22 |
| 5,504,838 | 4/1996 | Furuta et al. | 706/25 |
| 5,581,662 | 12/1996 | Furuta et al. | 706/25 |
| 5,619,617 | 4/1997 | Furuta et al. | 706/25 |

FOREIGN PATENT DOCUMENTS

| | | | |
|---|---|---|---|
| 3-29064 | 2/1991 | Japan . | |
| 3-260785 | 11/1991 | Japan | G06F 15/18 |
| 4-76660 | 11/1992 | Japan | G06F 15/18 |

*Primary Examiner*—Robert W. Downs
*Assistant Examiner*—Sanjin Shah
*Attorney, Agent, or Firm*—Staas & Halsey, LLP

[57] ABSTRACT

A neuroprocessing center executes a neuroprocessing using a neurocomputer. The neuroprocessing center is a public facility available for a user having a user terminal and executes the neuroprocessing as requested by the user. The user is given a result of the neuroprocessing. It is unnecessary for a user to have a computer implementing the neural network and anyone can participate in the profits of the neuroprocessing service. Examples of neuroprocessing service achieved by the neural network are graphic pattern generating services, character recognition services, sound synthesizing services, etc. A result of the neuroprocessing is effectively used by the user.

19 Claims, 34 Drawing Sheets

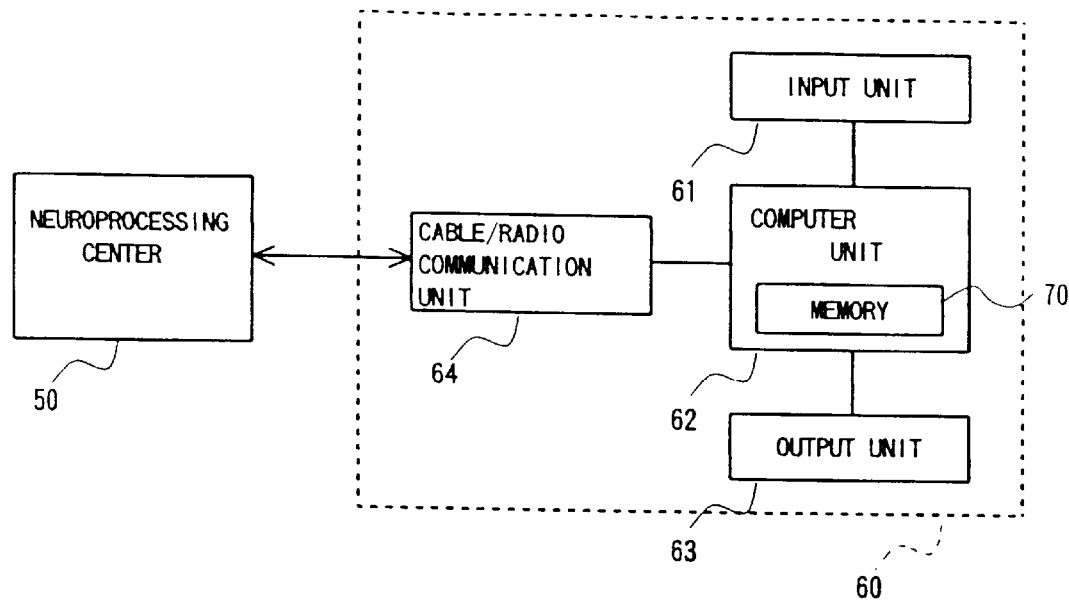
F I G. 7
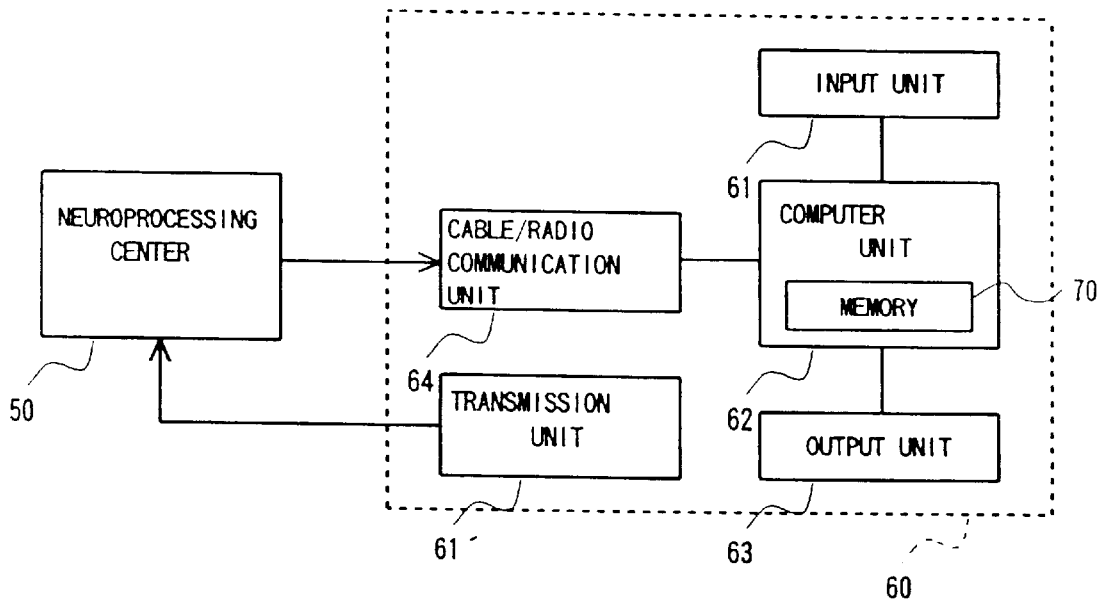
F I G. 8

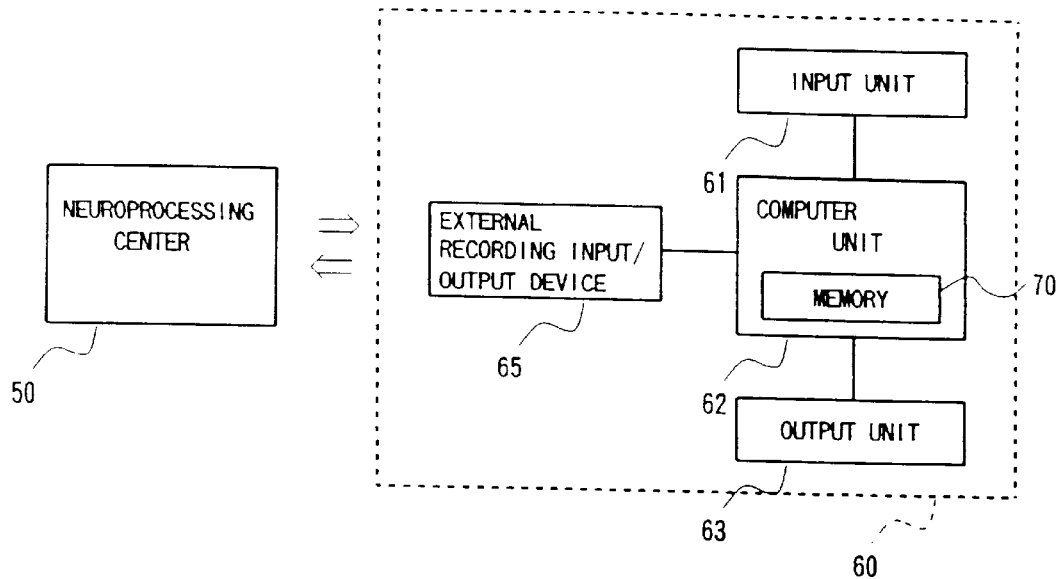
F I G. 9
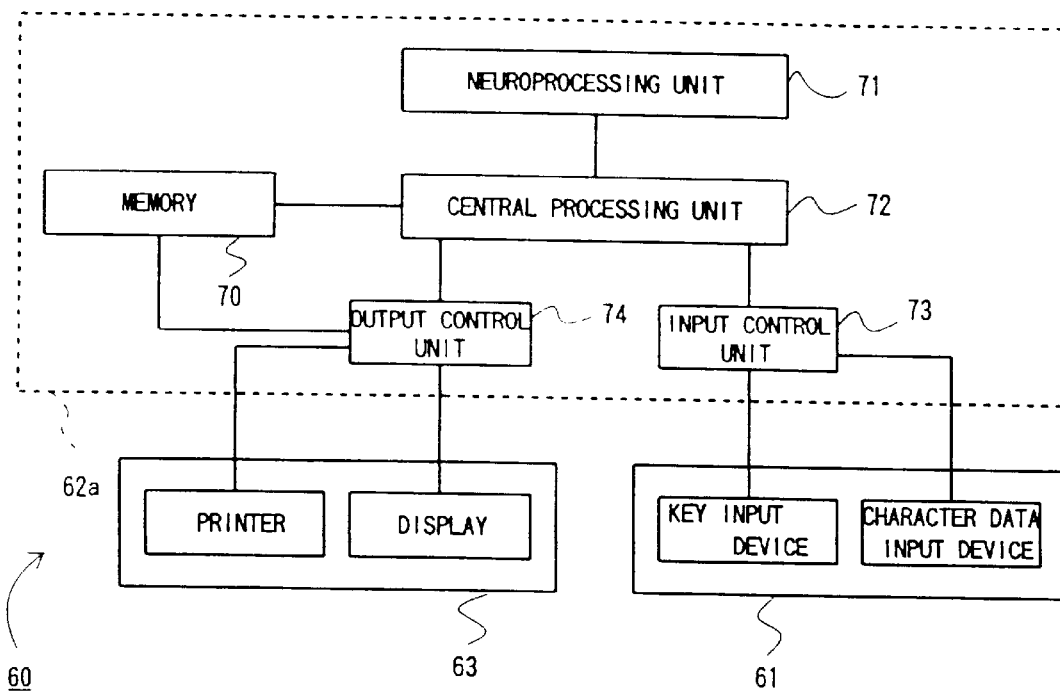
F I G. 10

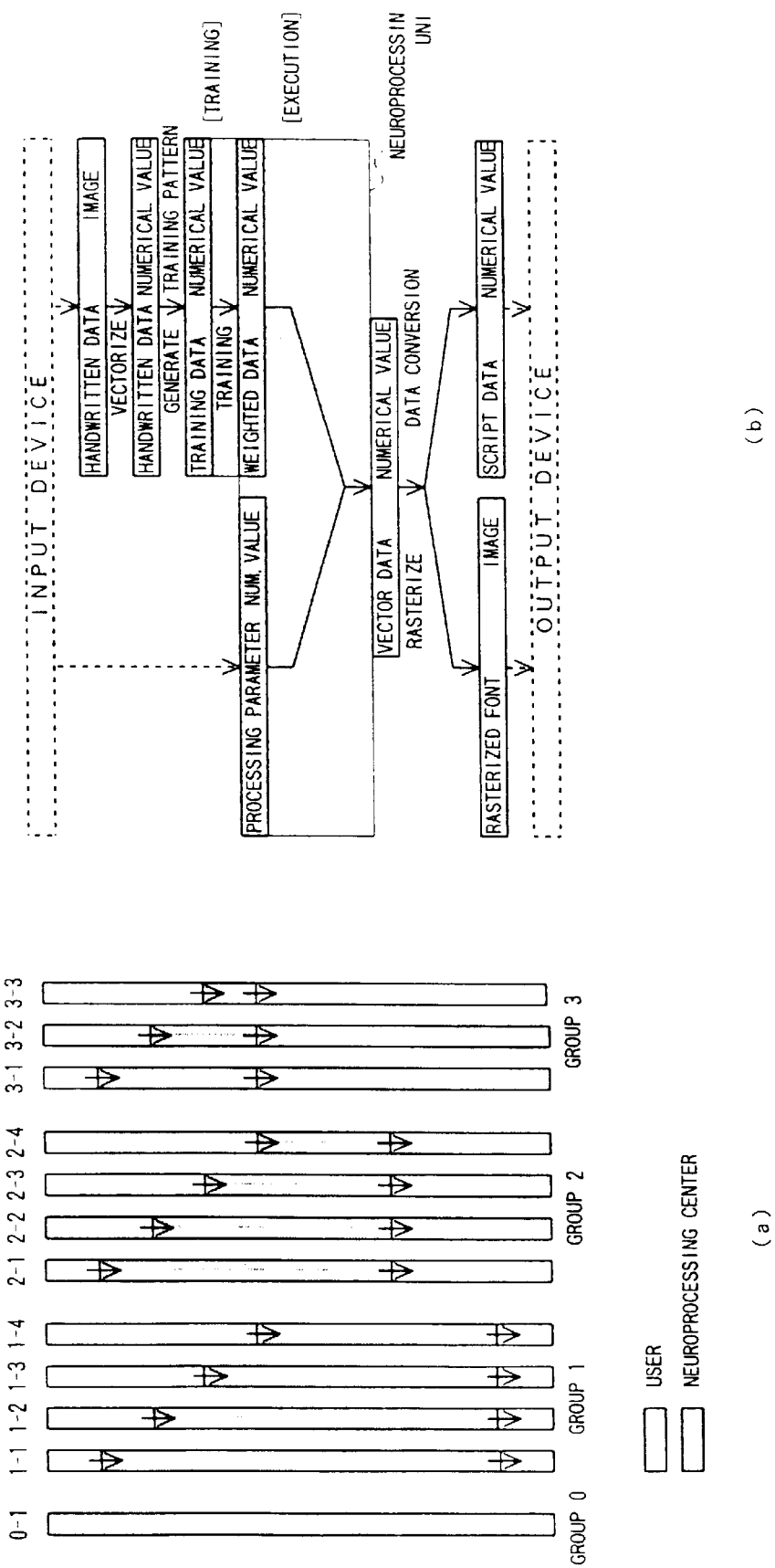
F I G. 11

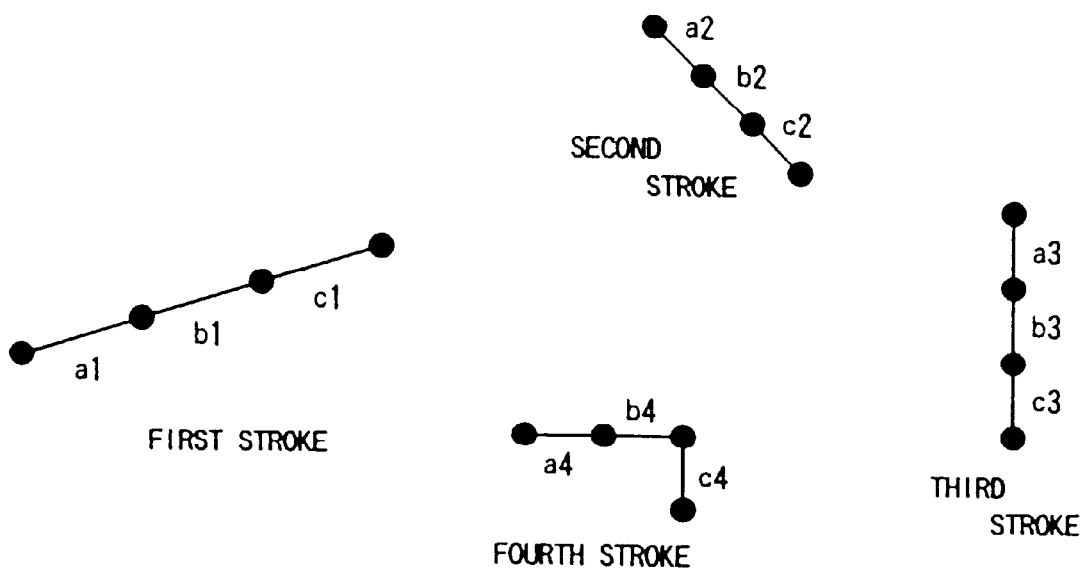
F I G. 1 3

(a)
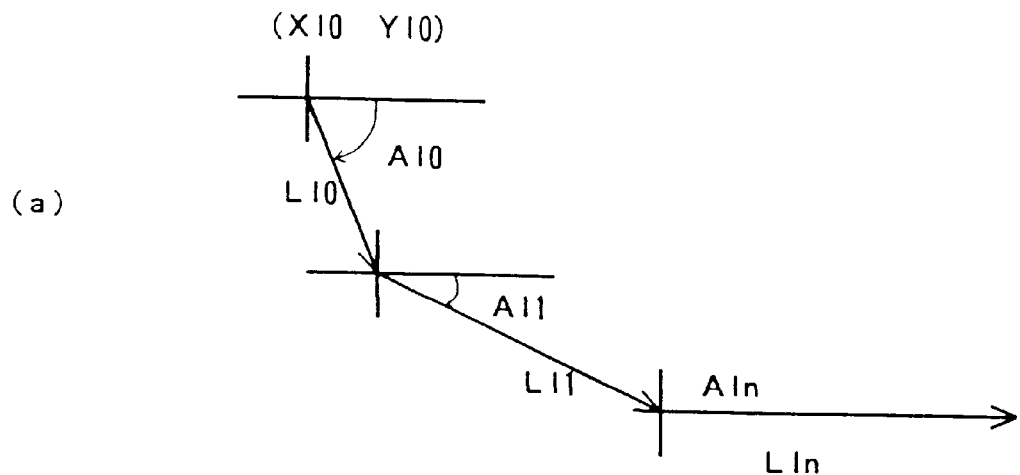
(b)
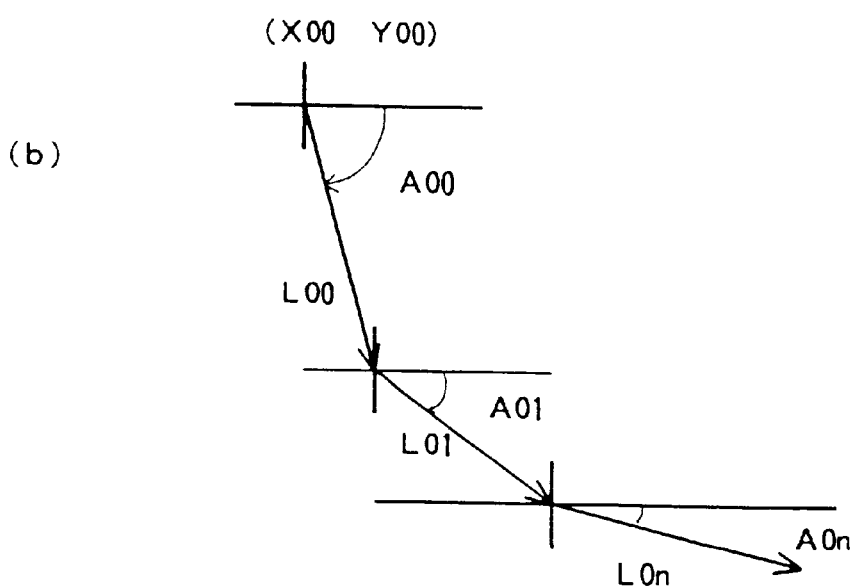
F I G. 1 4

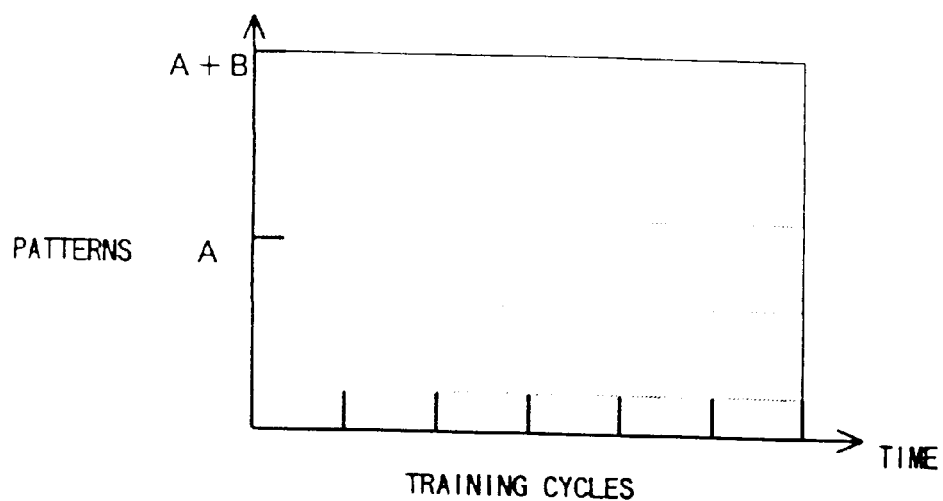
(a)
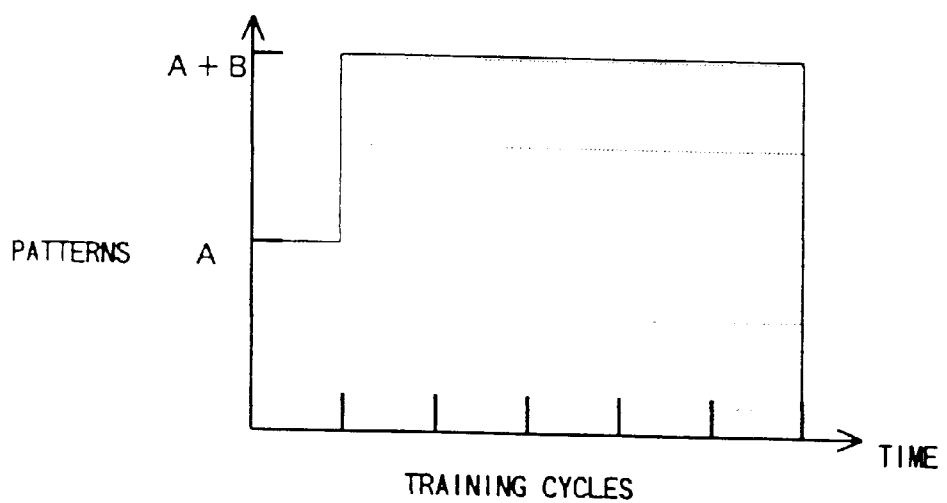
(b)
FIG. 19

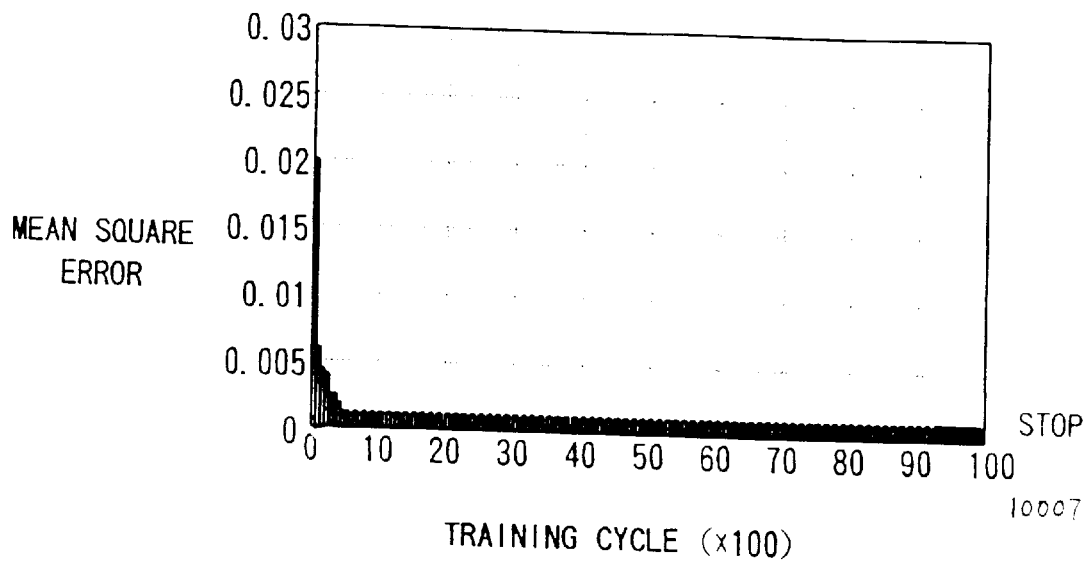
(a)
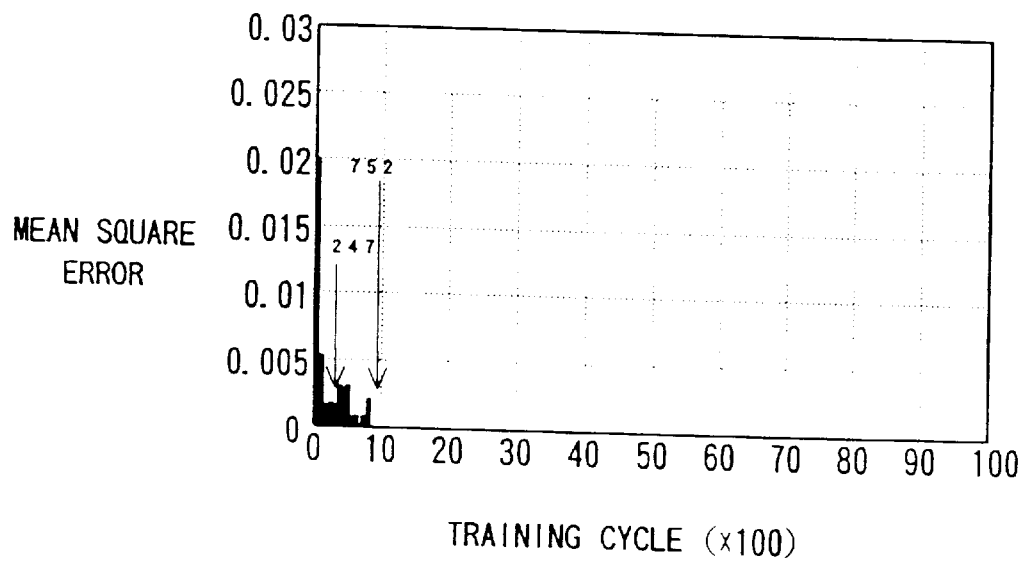
(b)
FIG. 21

INPUT PATTERN
(REFERENCE
CHARACTER)

TEACHER PATTERN
(PERSONAL
CHARACTER)

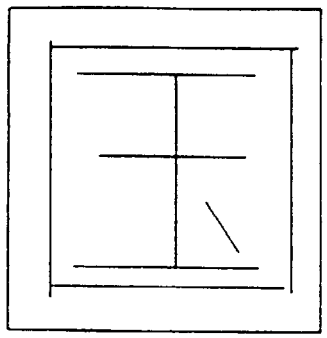
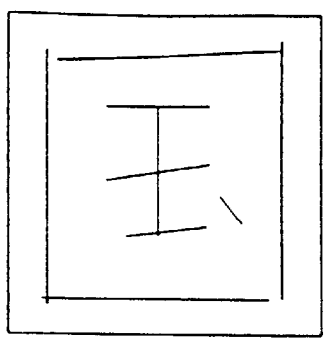
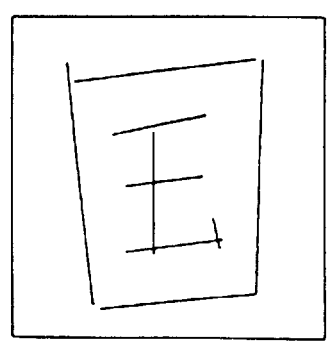
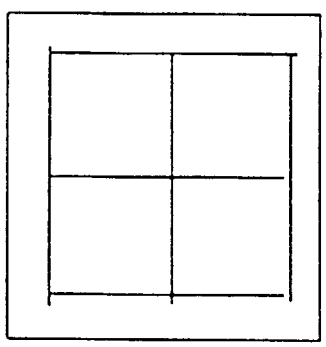
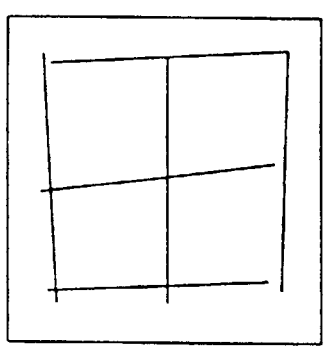
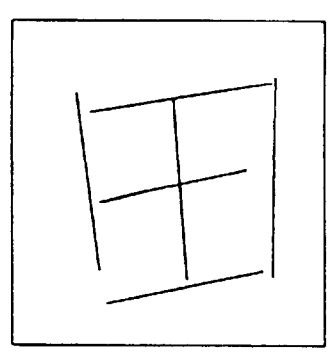
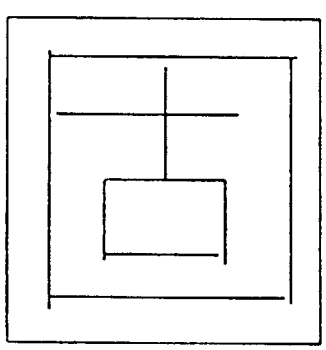
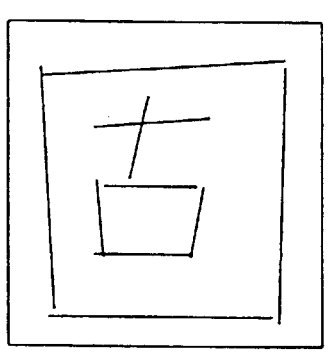
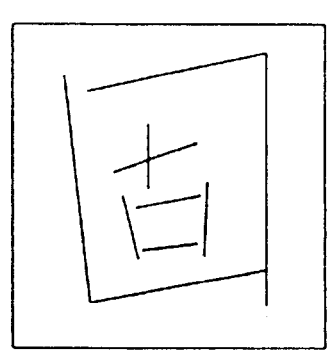
REFERENCE CHARACTERS
(a)
HANDWRITTEN CHARACTERS (MR. T)
(b)
HANDWRITTEN CHARACTERS (MR. Y)
(c)
F I G. 2 4

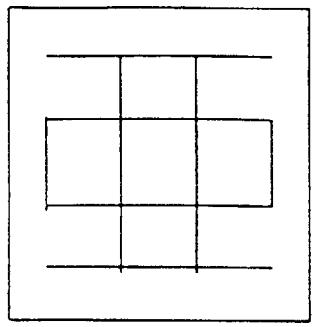
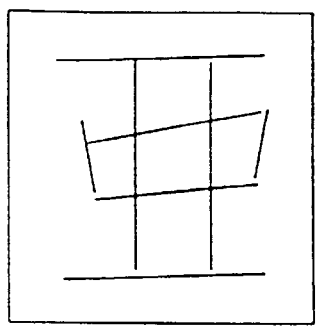
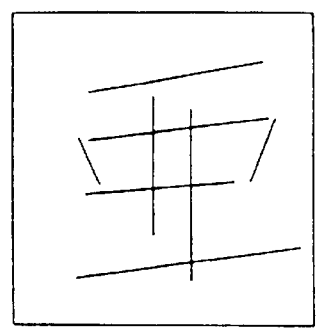
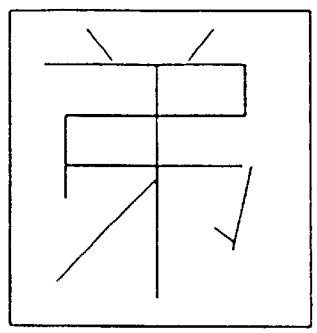
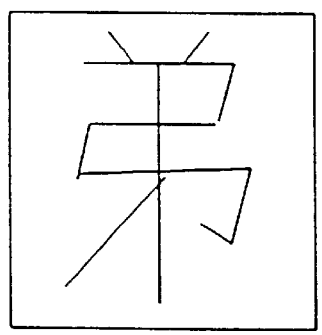
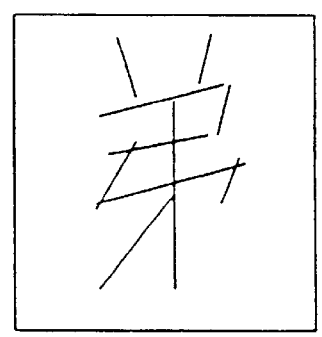
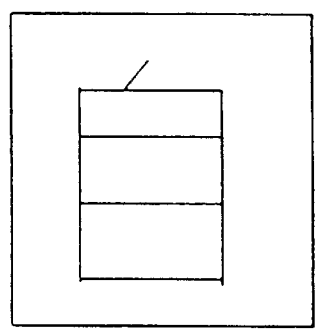
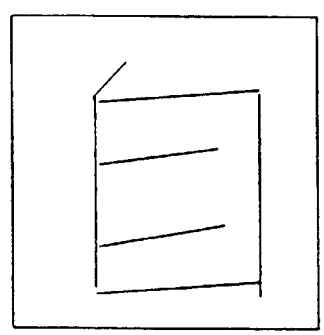
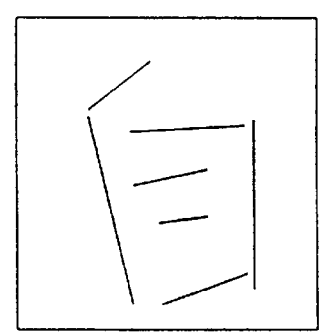
| REFERENCE CHARACTERS | HANDWRITTEN CHARACTERS (MR. T) | HANDWRITTEN CHARACTERS (MR. Y) |
|---|---|---|
| (a) | (b) | (c) |
FIG. 25

| | | | | | |
|---|---|---|---|---|---|
| PATTERN<PERSONAL №01> | 0.10000 | 0.90000 | 0.80000 | 0.00000 | 1 |
| → | 0.16000 | 0.70000 | 0.54000 | 0.04444 | : |
| PATTERN<PERSONAL №02> | 0.14000 | 0.68000 | 0.34000 | 0.75000 | 1 |
| → | 0.20000 | 0.50000 | 0.20000 | 0.83333 | : |
| PATTERN<PERSONAL №03> | 0.14000 | 0.66000 | 0.74000 | 0.00000 | 1 |
| → | 0.24000 | 0.48000 | 0.52000 | 0.04722 | : |
| PATTERN<PERSONAL №04> | 0.88000 | 0.66000 | 0.30000 | 0.75000 | 1 |
| → | 0.74000 | 0.64000 | 0.20000 | 0.69444 | : |
| PATTERN<PERSONAL №05> | 0.14000 | 0.38000 | 0.72000 | 0.00000 | 1 |
| → | 0.28000 | 0.30000 | 0.38000 | 0.05556 | : |
| PATTERN<PERSONAL №06> | 0.36000 | 0.90000 | 0.80000 | 0.75000 | 1 |
| → | 0.44000 | 0.68000 | 0.46000 | 0.73889 | : |
| PATTERN<PERSONAL №07> | 0.64000 | 0.90000 | 0.80000 | 0.75000 | 1 |
| → | 0.50000 | 0.64000 | 0.48000 | 0.74444 | : |
| PATTERN<PERSONAL №08> | 0.10000 | 0.10000 | 0.80000 | 0.00000 | 1 |
| → | 0.12000 | 0.08000 | 0.80000 | 0.04722 | : |
| PATTERN<REFERENCE №01> | 0.10000 | 0.90000 | 0.80000 | 0.00000 | 0 |
| → | 0.10000 | 0.90000 | 0.80000 | 0.00000 | : |
| PATTERN<REFERENCE №02> | 0.14000 | 0.68000 | 0.34000 | 0.75000 | 0 |
| → | 0.14000 | 0.68000 | 0.34000 | 0.75000 | : |
| PATTERN<REFERENCE №03> | 0.14000 | 0.66000 | 0.74000 | 0.00000 | 0 |
| → | 0.14000 | 0.66000 | 0.74000 | 0.00000 | : |
| PATTERN<REFERENCE №04> | 0.88000 | 0.66000 | 0.30000 | 0.75000 | 0 |
| → | 0.88000 | 0.66000 | 0.30000 | 0.75000 | : |
| PATTERN<REFERENCE №05> | 0.14000 | 0.38000 | 0.72000 | 0.00000 | 0 |
| → | 0.14000 | 0.38000 | 0.72000 | 0.00000 | : |
| PATTERN<REFERENCE №06> | 0.36000 | 0.90000 | 0.80000 | 0.75000 | 0 |
| → | 0.36000 | 0.90000 | 0.80000 | 0.75000 | : |
| PATTERN<REFERENCE №07> | 0.64000 | 0.90000 | 0.80000 | 0.75000 | 0 |
| → | 0.64000 | 0.90000 | 0.80000 | 0.75000 | : |
| PATTERN<REFERENCE №08> | 0.10000 | 0.10000 | 0.80000 | 0.00000 | 0 |
| → | 0.10000 | 0.10000 | 0.80000 | 0.00000 | : |

FIG. 29

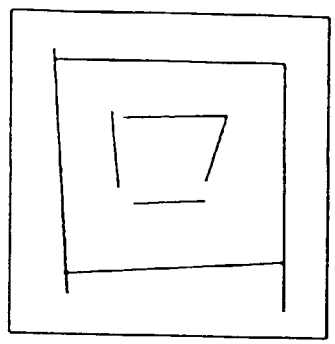
(a)
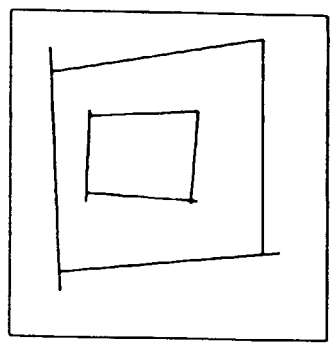
(b)
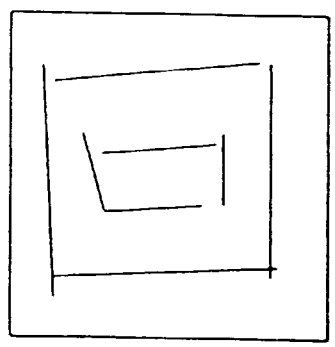
(c)
FIG. 30

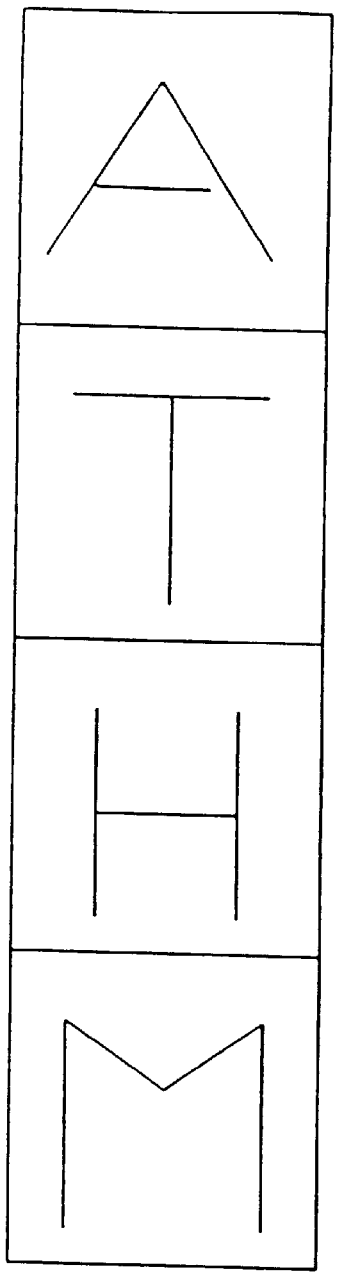
INPUT PATTERN
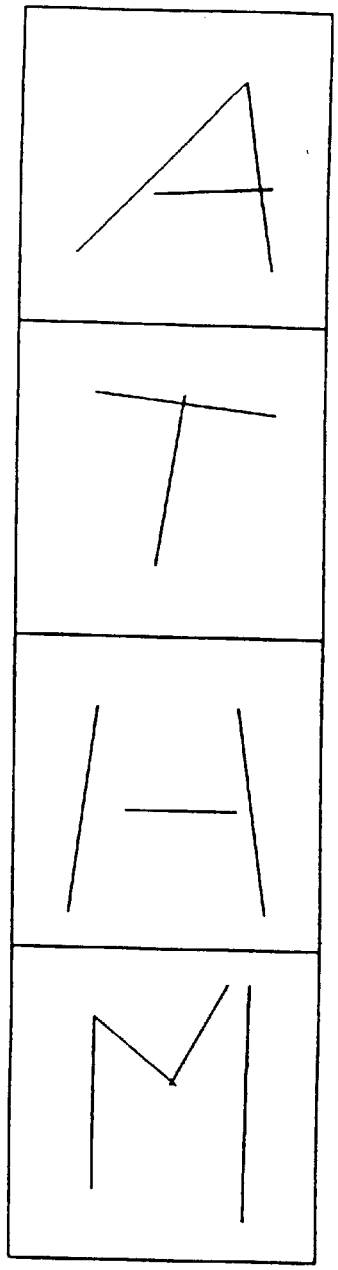
TEACHER PATTERN
F I G. 31

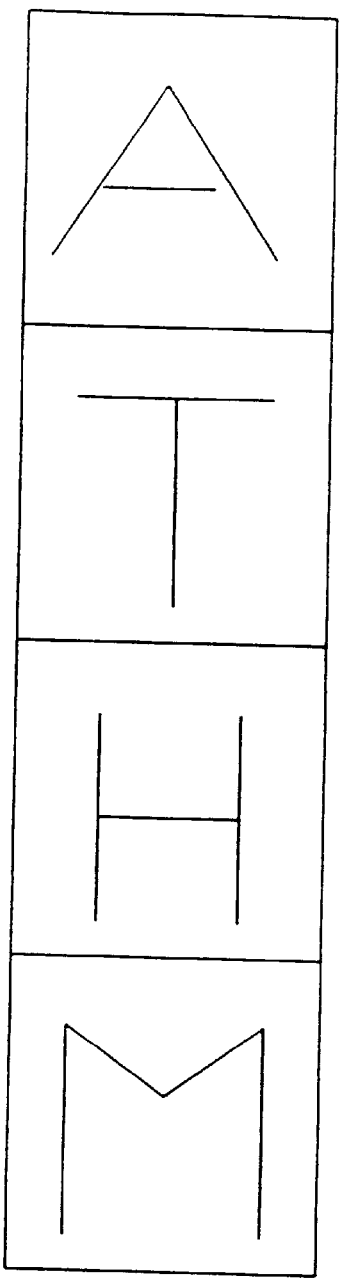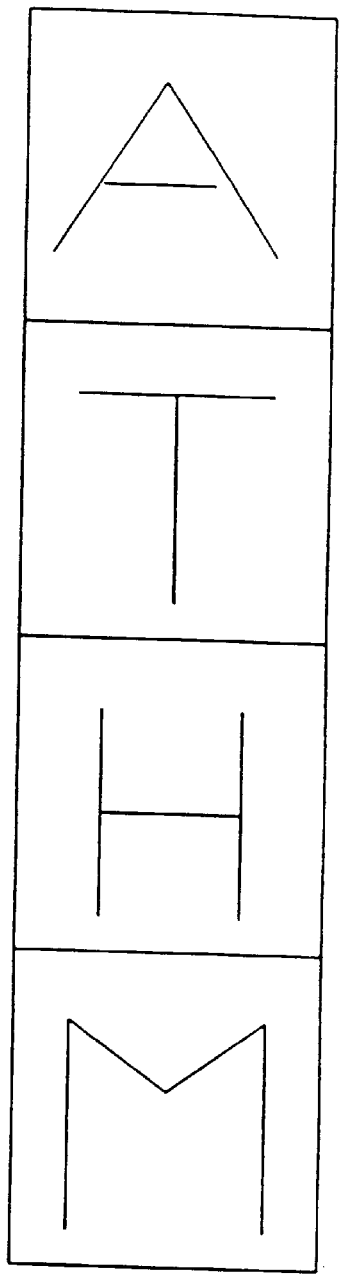
INPUT PATTERN  TEACHER PATTERN
FIG. 32

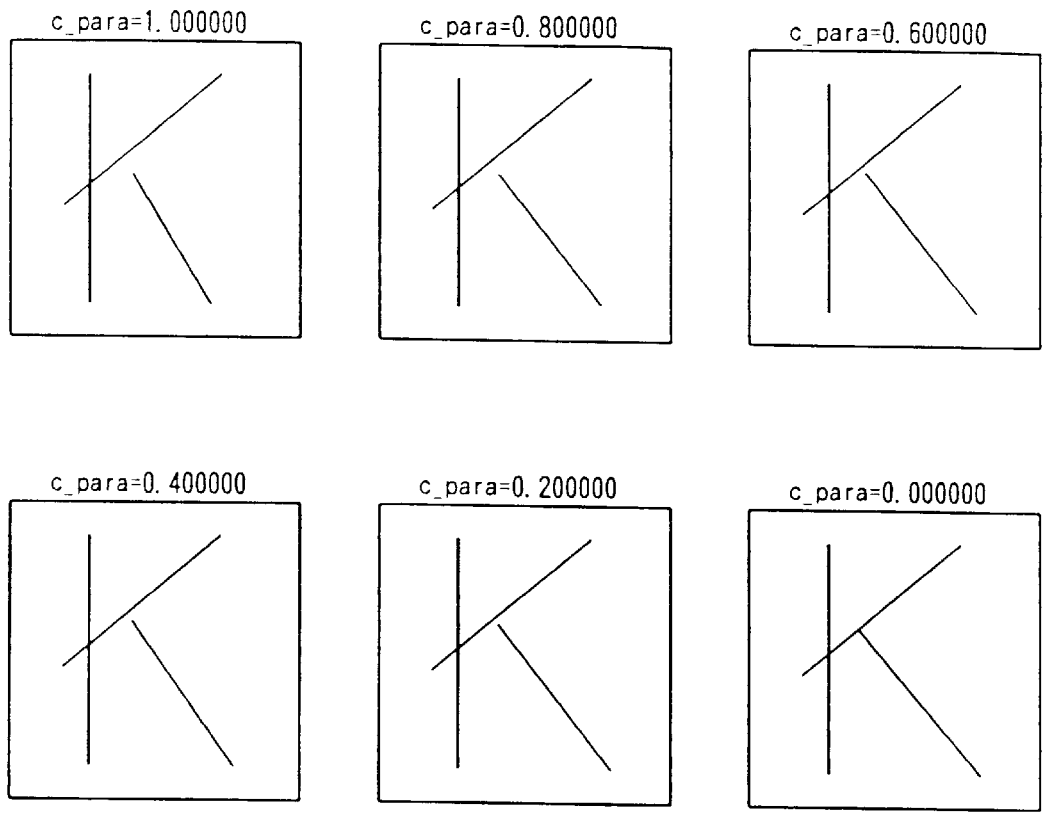
F I G. 3 3

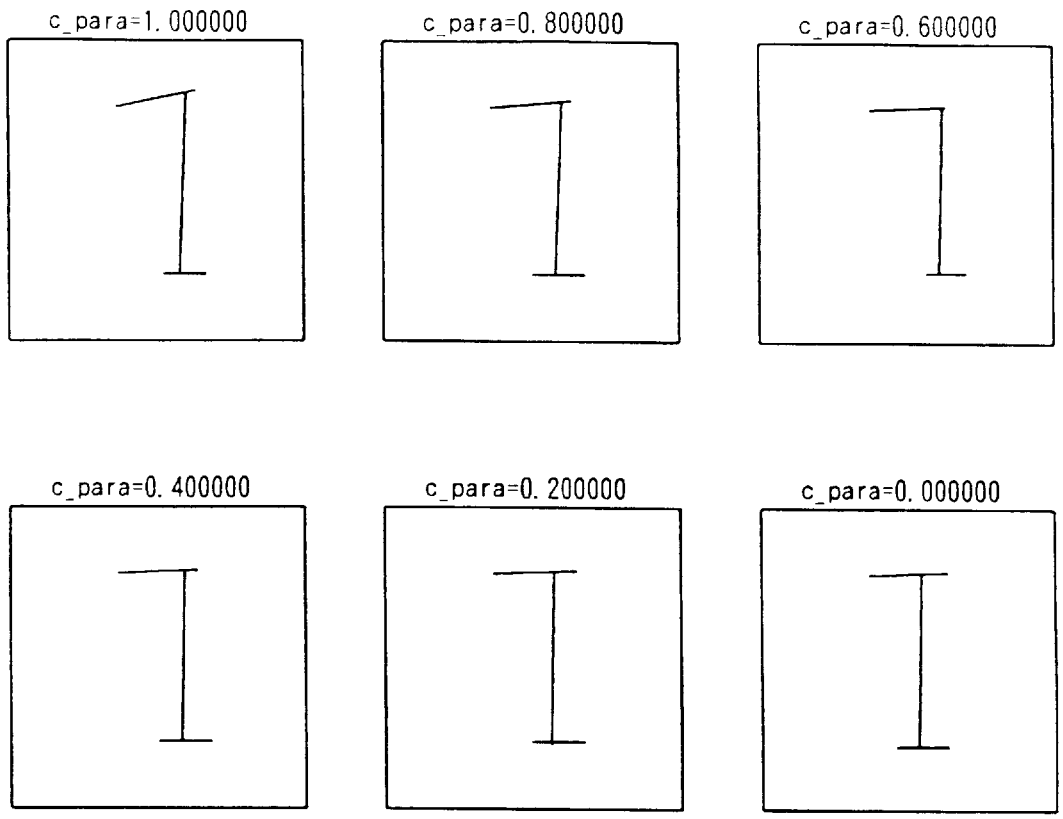
F I G. 3 5

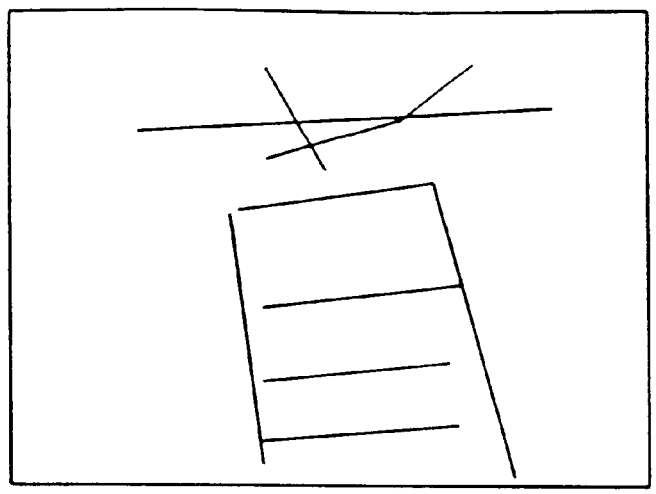
(a)
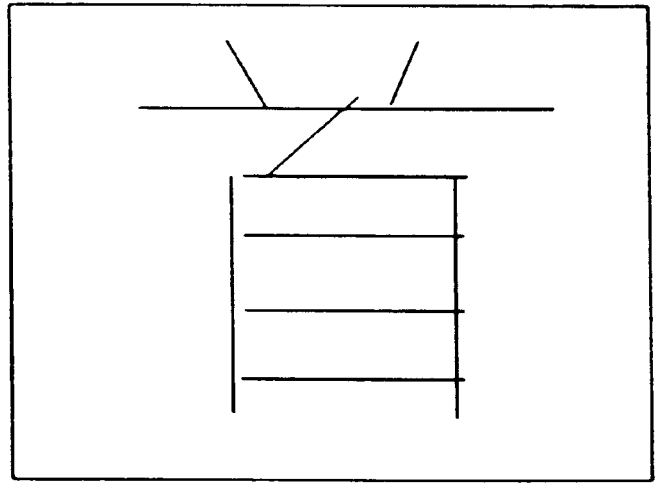
(b)
F I G. 3 7

NEUROPROCESSING SERVICE

CROSS-REFERENCE TO RELATED APPLICATIONS

This application is a division of application Ser. No. 08/351,557, filed Dec. 7, 1994, now U.S. Pat. No. 5,708,727 which is a continuation of application Ser. No. 08/034,391, filed Mar. 18, 1993, now abandoned.

BACKGROUND OF THE INVENTION

This invention generally relates to the neural networks and, in particular, to a method and system for providing a neuroprocessing service through a neuroprocessing center. The neural networks according to the present invention can be implemented in, for example, a graphic pattern modification system to electronically modify a graphic pattern such as a font of characters or the like.

It has been proposed to use the neural networks to process and control a computer system. As well known in the art, neural networks are typically composed of processing elements and connections. For example, a back propagation neural network is one of the most important and common neural network architecture, which is a hierarchical design consisting of fully interconnected layers of processing nodes. More particularly, the network architecture comprises at least an input layer and an output layer. The network architecture may further comprise an additional layer or N hidden layers between the input layer and the output layer where N represents an integer which is equal to or larger than zero. Each layer consists of one or more nodes which are connected by links with variable weights. The network is trained by initially selecting small random weights and internal thresholds and then presenting all training data repeatedly. Weights are adjusted after every trial using side information specifying the correct result until weights converge to an acceptable value. The neural network is thus trained by data representing input patterns and desired output patterns (teacher patterns) to automatically generate and produce a desired output for an unknown input.

It is conceivable that various processings and controls can be made by using the neural networks and one example thereof is now described.

Many graphic patterns in daily use can be formed by modifying other graphic patterns according to certain rules. A type family in typography is considered as one of the most typical example of such modification of patterns. There are various fonts (a set of characters) in typography, each of which consists of characters, symbols and numbers of one typeface such as Courier, Helvetica, and so on. Fancy letters and black letters are also used frequently in graphical printings. In Japanese, Chinese characters of kanji has its own typefaces such as mincho, gothic or antique. Mincho, one of the most popular and legible typefaces in Japanese, is a style of character having thin horizontal bars and thick vertical bars. Roman in the European typeface resembles Japanese mincho. Each of the horizontal and vertical bars includes an imbricated triangular portion at one end thereof.

In general, fonts are formed manually based on original characters created by a calligrapher or a font designer. To make one font requires laborious work especially in Japanese, due to several thousands of kanji. These fonts are adopted into various electronic devices such as a word processor, a personal computer, a DTP (desk top publishing) device or other basic peripheress. Information relating to the font is generally contained in a font memory (font cartridge), which is generally implemented by a read-only memory (ROM). The font memory is plugged into a printer and the fonts are stored therein in electronic forms. Each character is thus electronically represented by dots or functions for every one font, based on the original characters created by a calligrapher or a font designer. As a result of the electronic manipulation of fonts, fonts differ slightly from manufacturers to manufacture or, even with the same manufacturer. For example, word processing packages using Helvetica 12 point may modify this font electronically so that it appears to be a new font, or even the shape of the imbricated triangular portion of mincho based on a certain rule slightly differs from the manufacturer of the word processor or the like. Such technique results in expensive and time-consuming process for making an additional font because a singular font consists of a large number of characters, symbols and numbers. Accordingly, it has been required to provide a facile method for creating a novel font which is different from those of others. This is also true with alphabets where typefaces are protected under the copyright law and unauthorized copying thereof is forbidden.

Creation of a novel font is additionally advantageous, as follows. A font memory of a word processor generally contains a predetermined font so that different articles written on the same word processor are exactly equal in face. A paper written on a word processor is legible and regularly formed while there appears no individuality of characters.

Recently, many people use a word processor for writing a personal letter in Japan and most of the word processors for personal use are found to be used for writing New Year's greeting cards. Such greeting cards with fixed types make unnecessarily formal impressions and are often not acceptable. Similarly, Christmas cards or other season greetings cards with fixed types are often not acceptable. A special font for each individual is hence the ideal as the exclusive font of characters of a personal word processor. The font is, however, generated manually as mentioned above. This sometimes costs several hundred thousands or several million dollars. Most people cannot afford such a costly font exclusive only to their personal word processors. The present invention accordingly proposes utilizing the neural networks to create a personal font of characters, thereby making inexpensive personal fonts available. The inventor also suggests an approach to other possible applications of the neuroprocessing service.

Though the above-mentioned neural networks can be realized using software for conventional hardware, it is preferable to use a neurocomputer having an exclusive MPU (micro processing unit) called a neurochip. Typical neurochips are disclosed in, for example, Japanese Patent Unexamined Prepublication Nos. 64788/1990, 226382/1990 and 228784/1990. However, most people cannot afford such expensive hardware and thus, it has been desired to provide a neurocomputer for public use.

Accordingly, a primary object of the present invention is to provide a neuroprocessing service which is available for the public, in an effective manner at a reasonable cost.

Another object of the present invention is to provide a method and system for readily creating various fonts of characters.

SUMMARY OF THE INVENTION

According to a first aspect of the present invention, a neuroprocessing center for a user is provided. The neuroprocessing center provides neuroprocessing service as requested from a user and the user is given a processing result. A magnetic recording medium such as a flexible disc, an optical disc or other recording media may be used to exchange data between the user terminal and the neuroprocessing center. However, it is preferable to utilize a cable/radio communication line to access the neuroprocessing center from the user terminal.

According to the present invention, it is unnecessary for a user to have a computer implementing the neural network and anyone can utilize the neuroprocessing service. However, a user terminal may comprise a small-scaled neural network system, sufficiently. The neuroprocessing can be assigned between the neuroprocessing center and the user terminal when the user terminal comprises the neural network system. For example, the neural network in the neuroprocessing center is trained and the result thereof is given to the neural network system at the user side.

The present invention provides public services, such as a graphic pattern generating service, a character recognition service or a sound synthesizing service, through the neural network system. The user can use the processing results obtained after training of the neural network.

The graphic pattern generating service will be described as an example to which the present invention can be applied. With sample data indicative of graphic patterns, such as characters in a certain pattern or style, the neural network is trained and automatically produces information about many graphic patterns other than the samples, which contributes to provide a set of an extremely large number of patterns at a reasonable cost.

Another aspect of the present invention is to provide modified graphic patterns. For this purpose, a subset of modified patterns is first prepared by modifying each of the corresponding original patterns into a preferable shape. The modification is made in accordance with a specified modification rule. Data indicative of the subset of modified patterns are supplied to the neural network as teacher patterns and data indicative of the original patterns are supplied thereto as input patterns. The neural network learns the modification rule during training by calculating a difference between the input pattern and the teacher pattern. When the weight converges to an acceptable value, the neural network enables creation of the modified patterns for unknown patterns.

As mentioned above, a font of characters is obtained by modifying the original characters based on the specified modification rule. In other words, the font or a complete set of characters of one particular size, style and weight can be made as a result of modification of the original characters. Accordingly, it becomes possible to automatically modify a set of characters through the neural network. The neural network is trained by using a group of desired characters and original characters. Such graphic pattern processing itself is quite novel and advantageous.

According to the present invention, it is possible to provide neural networks available to be accessed at any time by any of the users with the processing result of the neuroprocessing available on his/her user terminal.

Other advantages and features of the present invention will be described in detail in the following preferred embodiments thereof.

BRIEF DESCRIPTION OF THE INVENTION

FIG. 7 is a block diagram showing a first embodiment of the neuroprocessing service system according to the present invention;

FIG. 8 is a block diagram showing a second embodiment of the neuroprocessing service system according to the present invention;

FIG. 9 is a block diagram showing a third embodiment of neuroprocessing service system according to the present invention;

FIG. 10 is a block diagram of a user terminal having a neuroprocessing unit therein;

Figure 12:
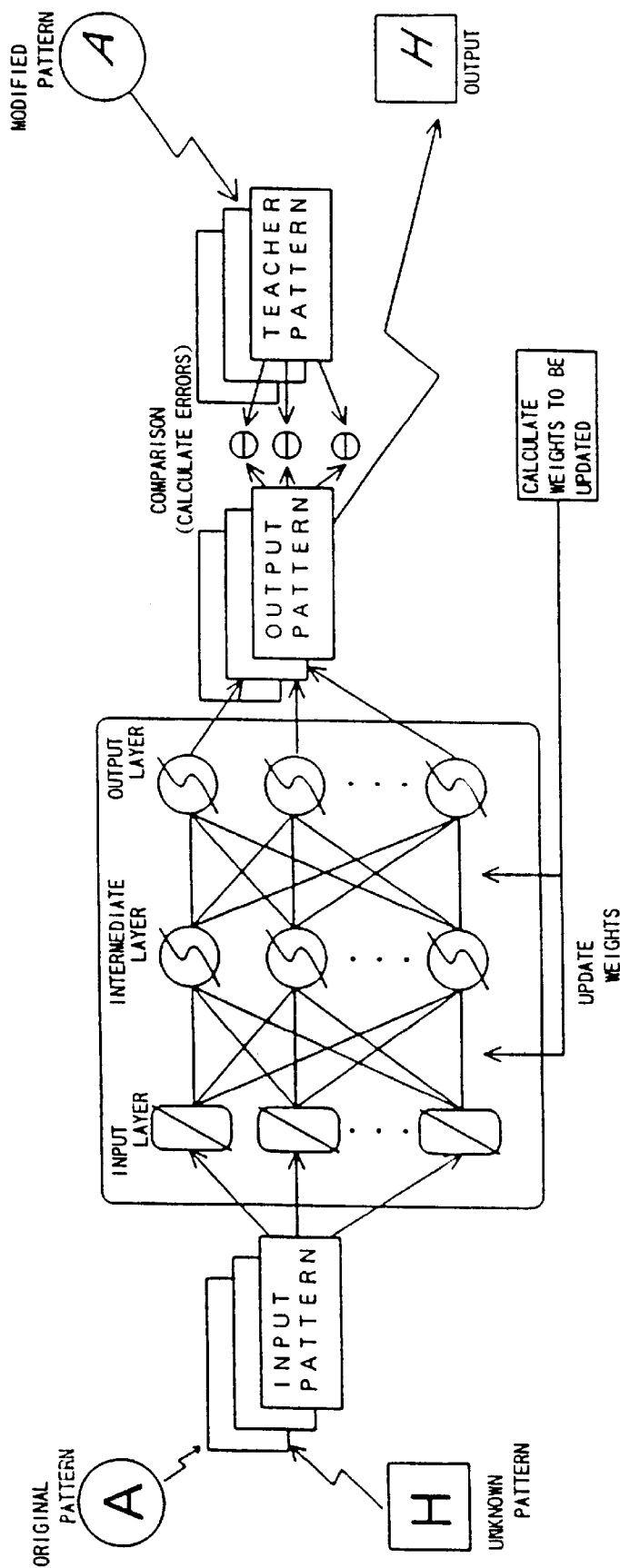
Figure 15:
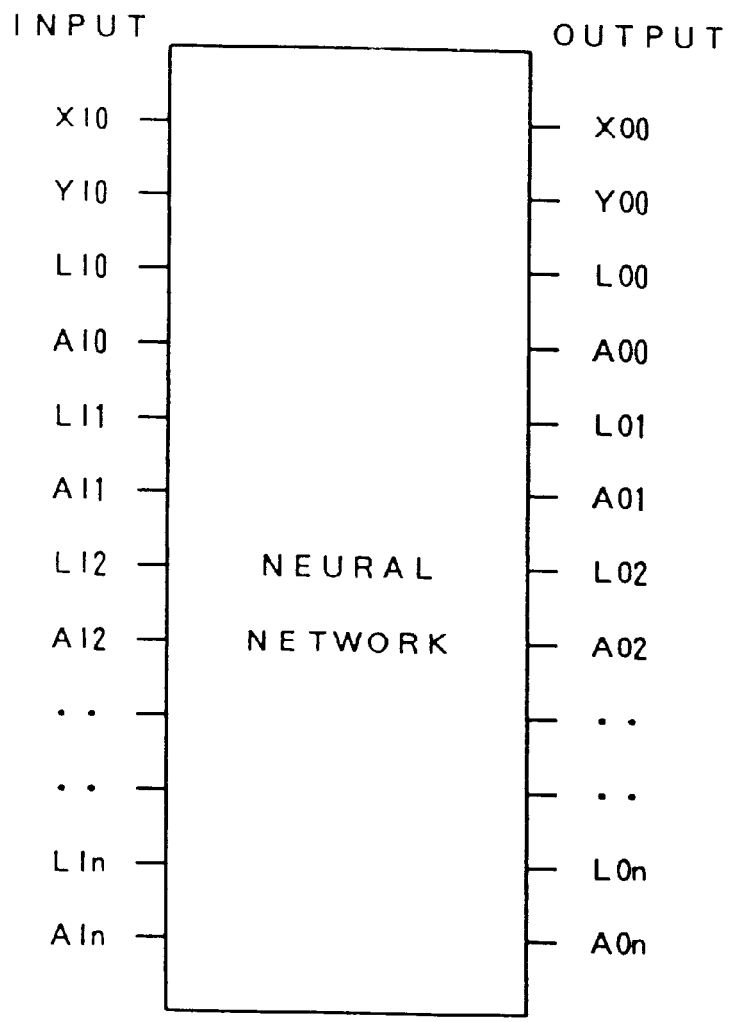
Figure 18:
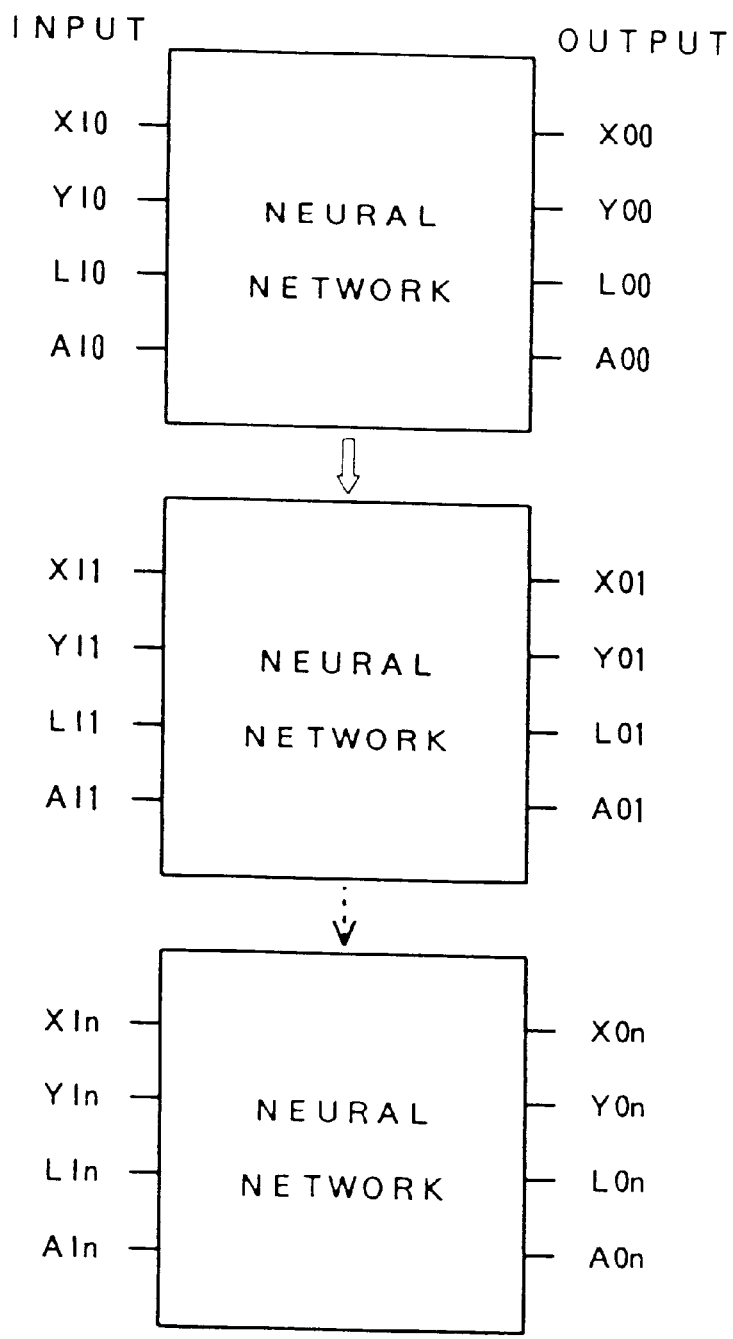
Figure 20:
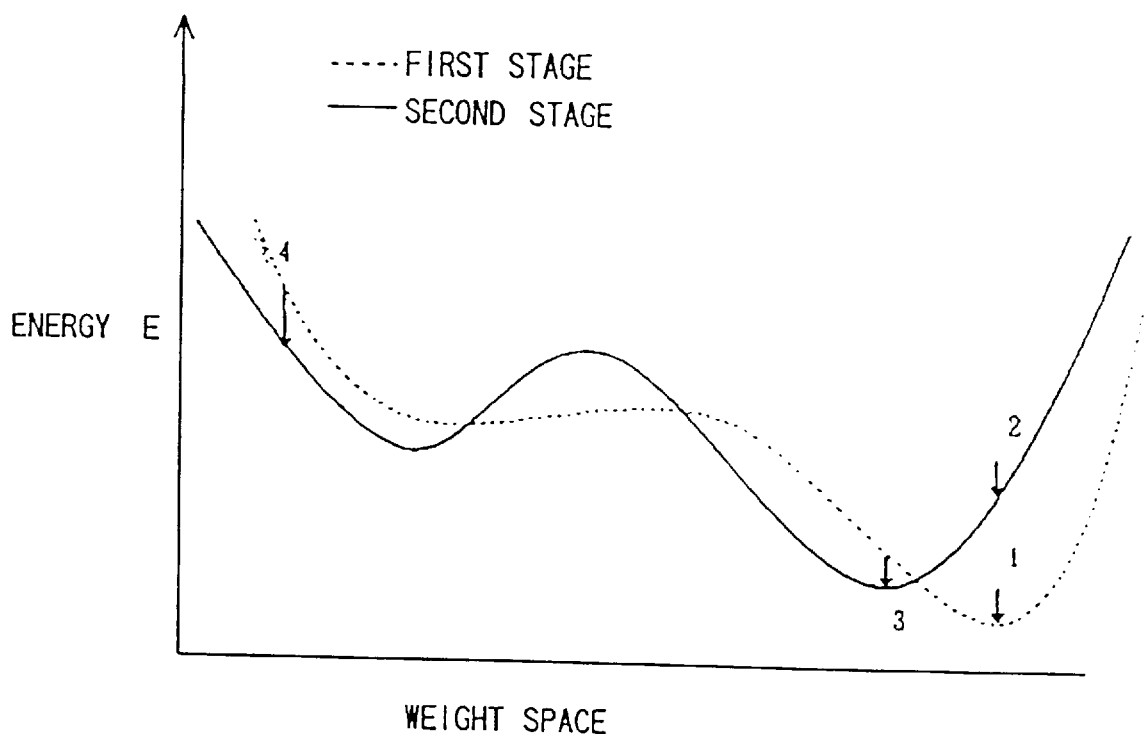
Figure 23:
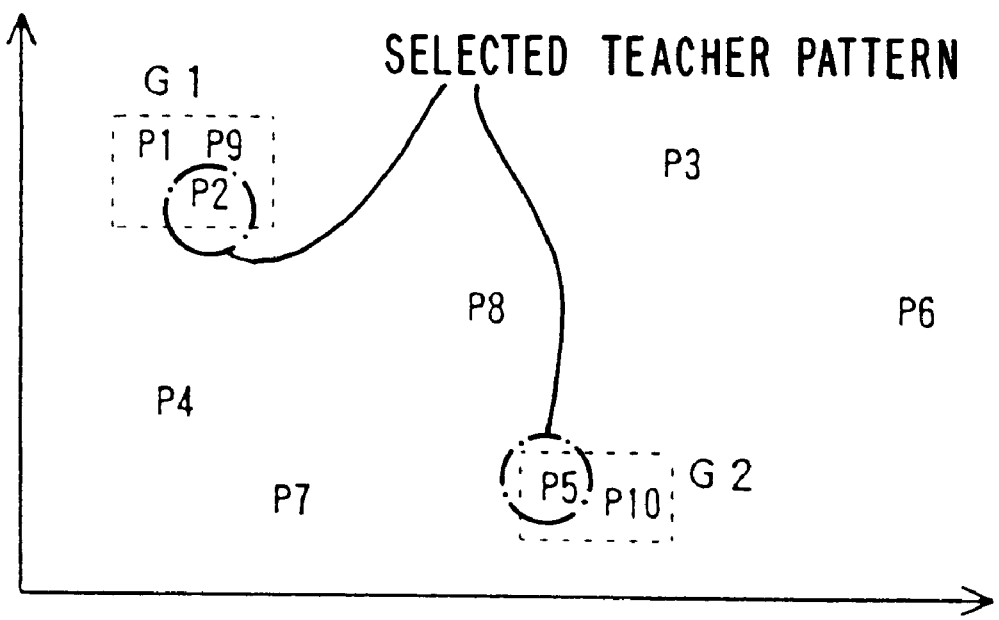
Figure 26:
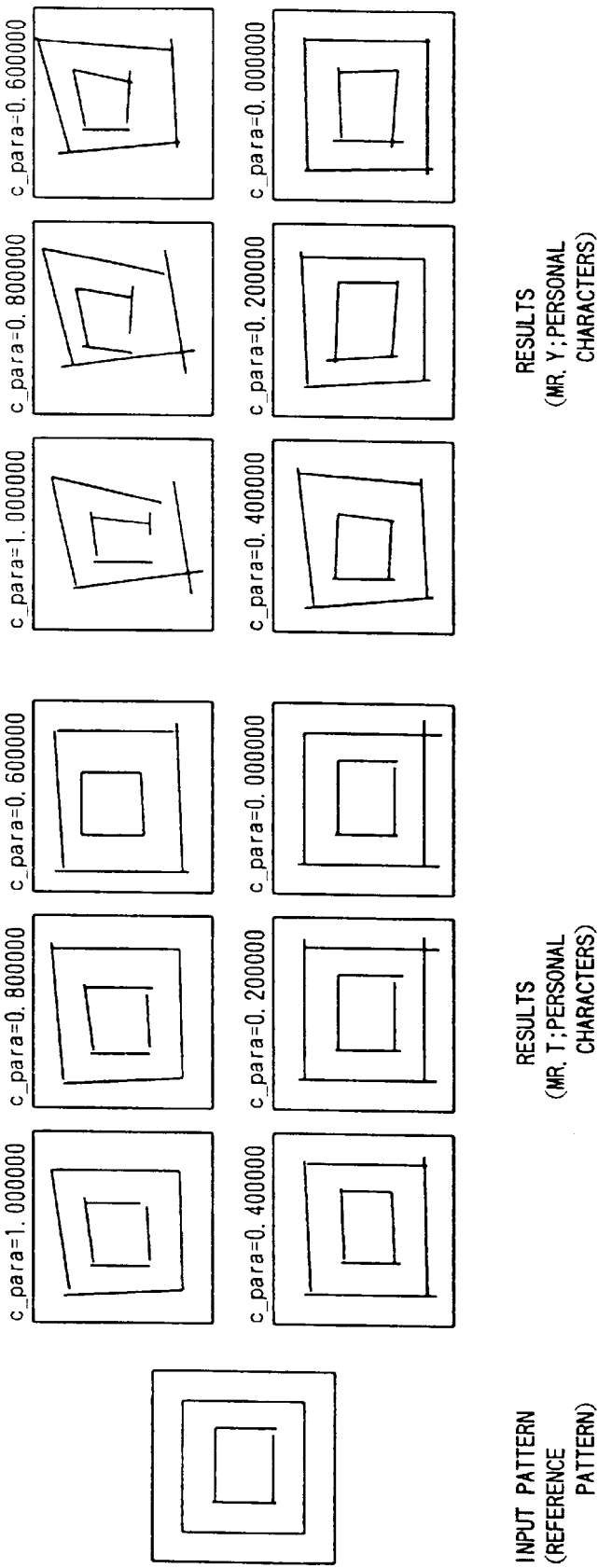
Figure 27:
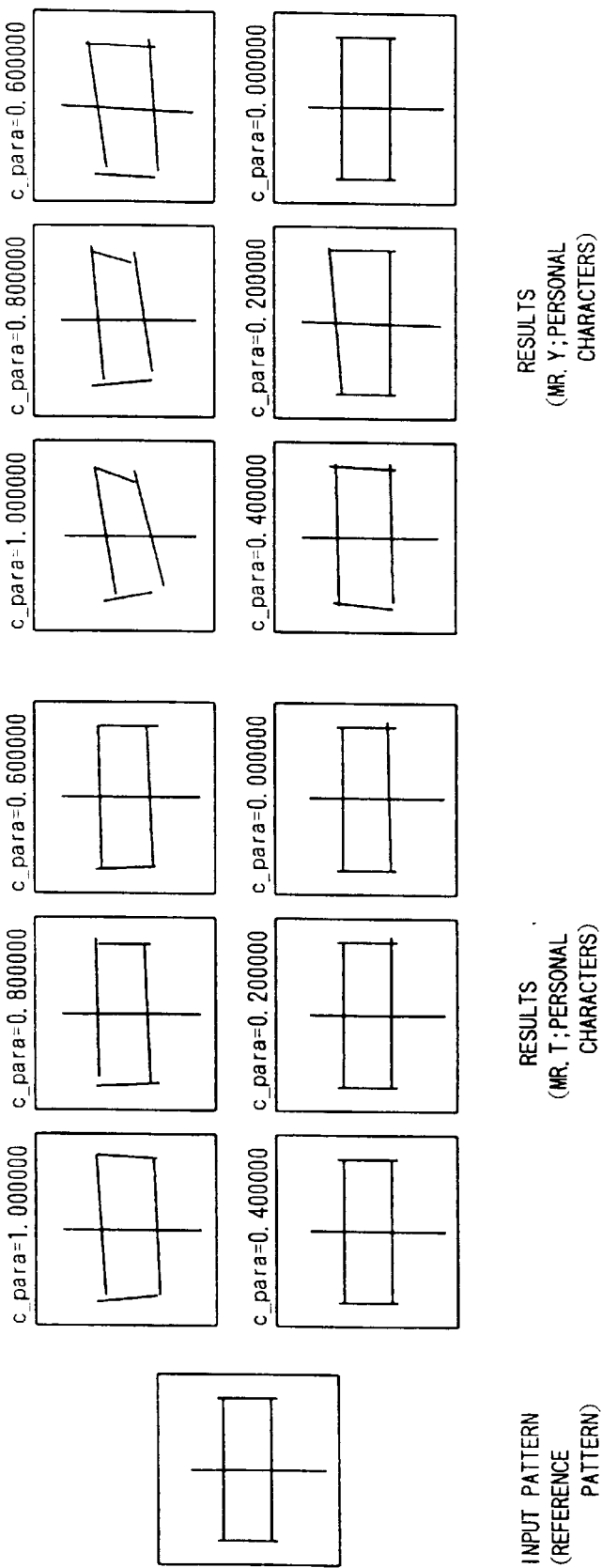
Figure 28:
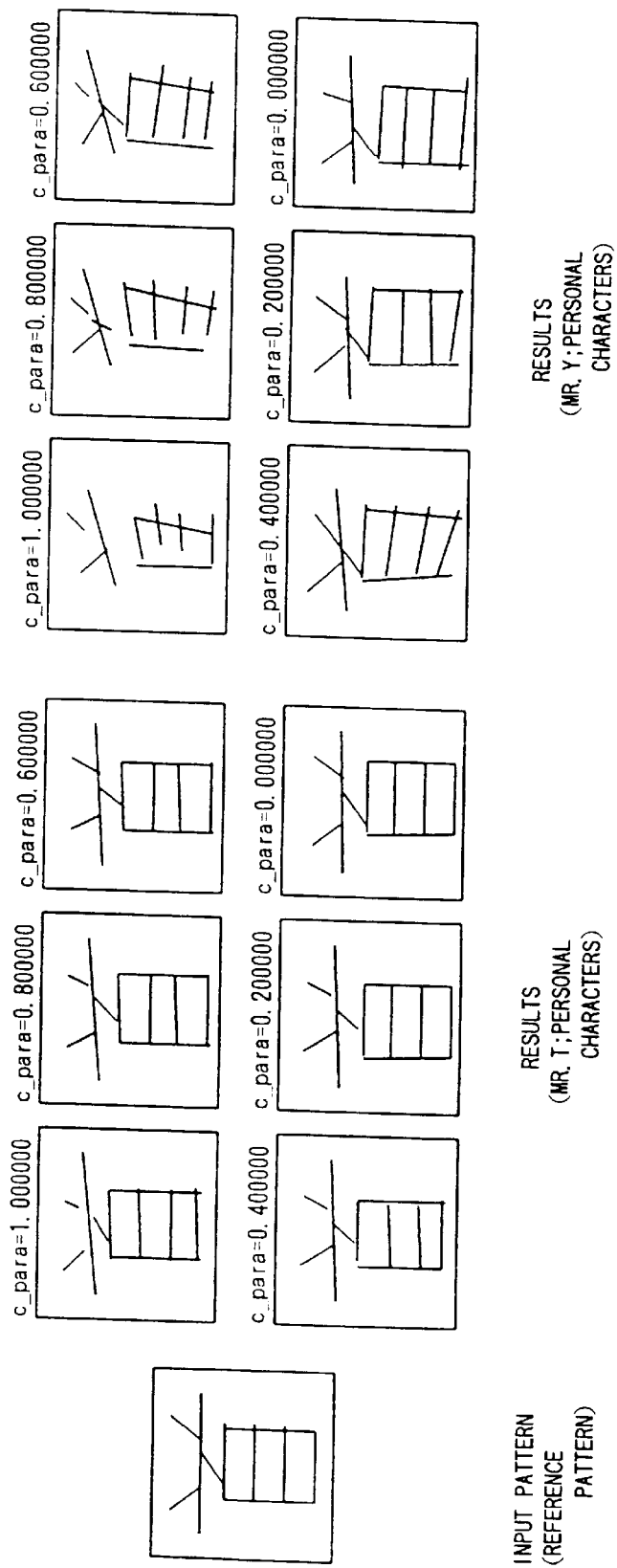
Figure 34:
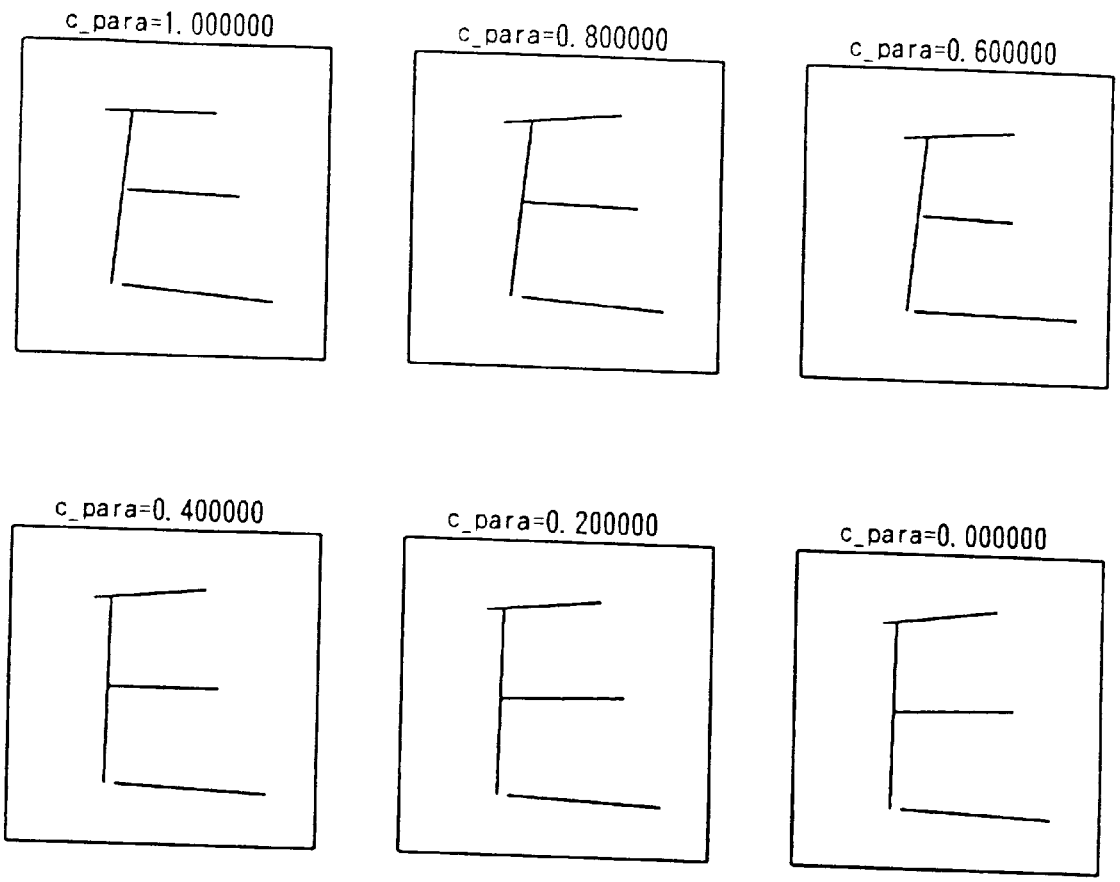
Figure 36:
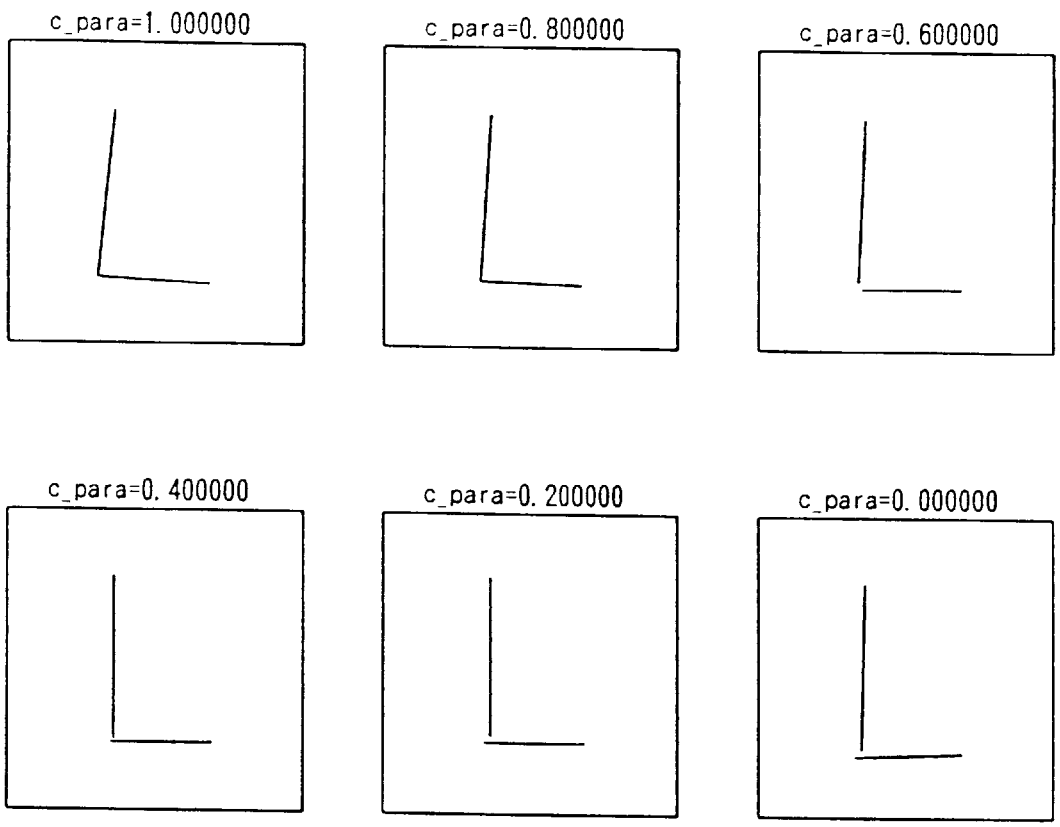
Figure 38:
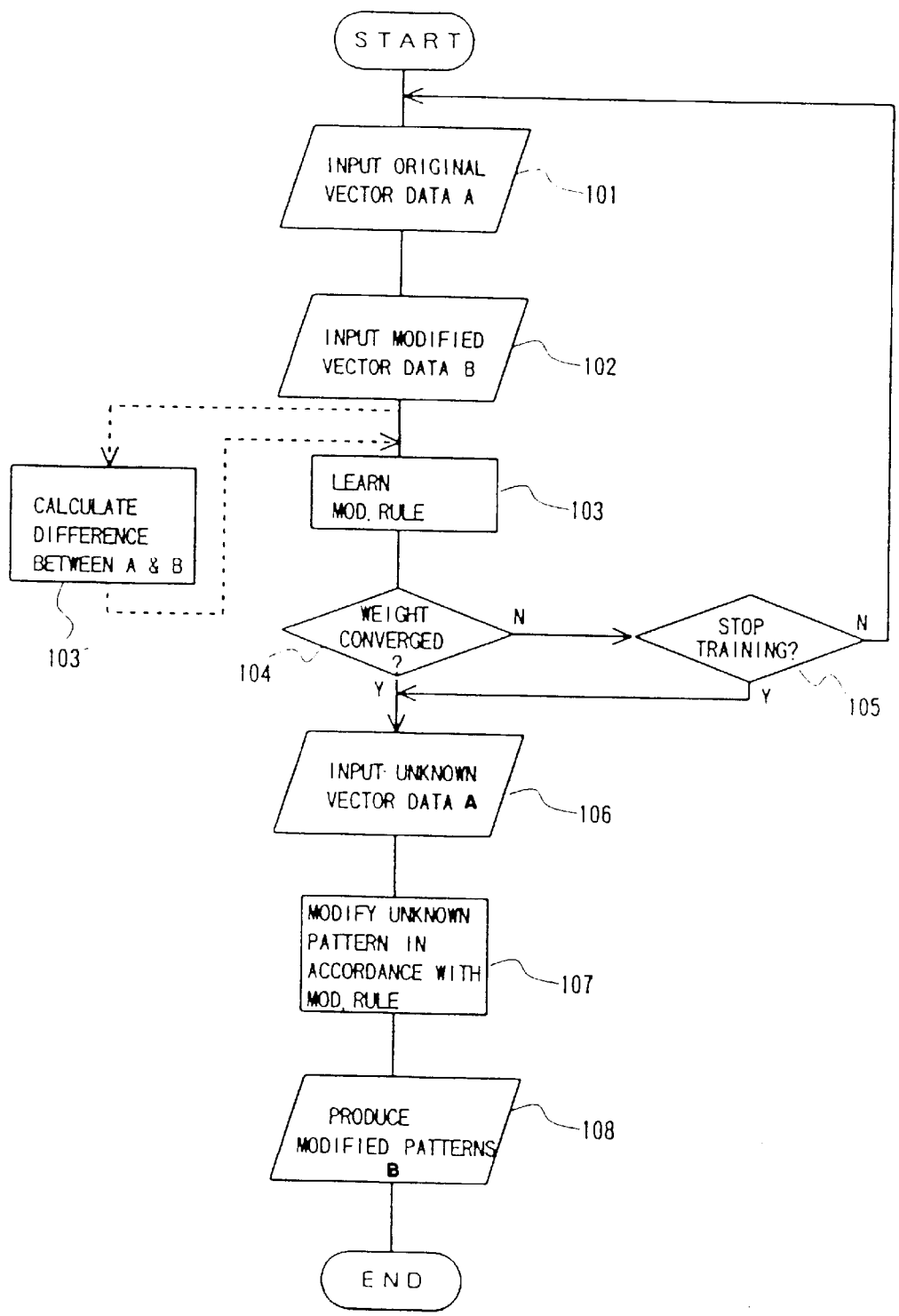

FIGS. 11(a) and 11(b) are views for use in describing assignment of neuroprocessing, in which, FIG. 11(a) shows time charts representing an example of process assignment for graphic pattern generating service and FIG. 11(b) shows a flow diagram corresponding to the time chart illustrated in FIG. 11(a);

FIG. 12 is a schematical block diagram for use in describing operation of a graphic pattern generating system according to the present invention;

FIGS. 13(a) show examples of character strokes consisting of a plurality of line segments obtained by a first pattern generating method according to the present invention;

FIGS. 14(a)–(b) are views showing how to represent the line segments in FIG. 13(a)–(d) as vector data, in which FIG. 14(a) represents an example of an original vector data and FIG. 14(b) represents a feature vector obtained by converting the data illustrated in FIG. 14(a);

FIG. 15 is a block diagram showing relation between the incoming data and the outgoing data of the neural network in the first pattern generating method according to the present invention;

FIGS. 16(a) and 16(b) show examples of character strokes consisting of a plurality of line segments obtained by a second pattern generating method according to the present invention;

FIGS. 17(a) and 17(b) are views showing how to represent the line segments in FIGS. 16(a) and 16(b) as vector data, in which FIG. 17(a) represents an example of an original vector data and FIG. 17(b) represents a feature vector obtained by converting the data illustrated in FIG. 17(a);

FIG. 18 is a block diagram showing relation between the incoming data and the outgoing data of the neural network in the second pattern generating method according to the present invention;

FIGS. 19(a) and 19(b) are graphical representations comparing single-stage training and two-stage training regarding the number of the training cycle and the number of patterns used;

FIG. 20 is a graphical diagram showing the energy spaces and convergence points of the network;

FIGS. 21(a) and 21(b) are graphical representations comparing single-stage training and two-stage training regarding the number of presentations of the training to the set work and the mean square error;

FIG. 22 shows an example where plural types of teacher patterns are made for one input pattern;

FIG. 23 is a view for use in describing a processing method when a plurality of teach patterns are provided for one input pattern;

FIG. 24 shows examples of original character patterns and hand-written character patterns;

FIG. 25 shows other examples of original character patterns and hand-written character patterns;

FIG. 26 shows character patterns generated by the neural network at various control parameters;

FIG. 27 shows other character patterns generated by the neural network at various control parameters;

FIG. 28 shows other character patterns generated by the neural network at various control parameters;

FIG. 29 is an example of teacher patterns;

FIGS. 30(a), 30(b) and 30(c) are views of outputs generated by the neural network trained in accordance with a first and second training method;

FIG. 31 shows examples of original character patterns and hand-written character patterns;

FIG. 32 shows other examples of original character patterns and hand-written character patterns;

FIG. 33 shows character patterns generated by the neural network at various control parameters;

FIG. 34 shows character patterns generated by the neural network at various control parameters;

FIG. 35 shows character patterns generated by the neural network at various control parameters;

FIG. 36 shows character patterns generated by the neural network at various control parameters;

FIGS. 37(a) and 37(b) are views comparing output data supplied from the neural network trained in accordance with the first and the second training method;

FIG. 38 is a flow chart showing basic operation of the present invention; and

Figure 39:
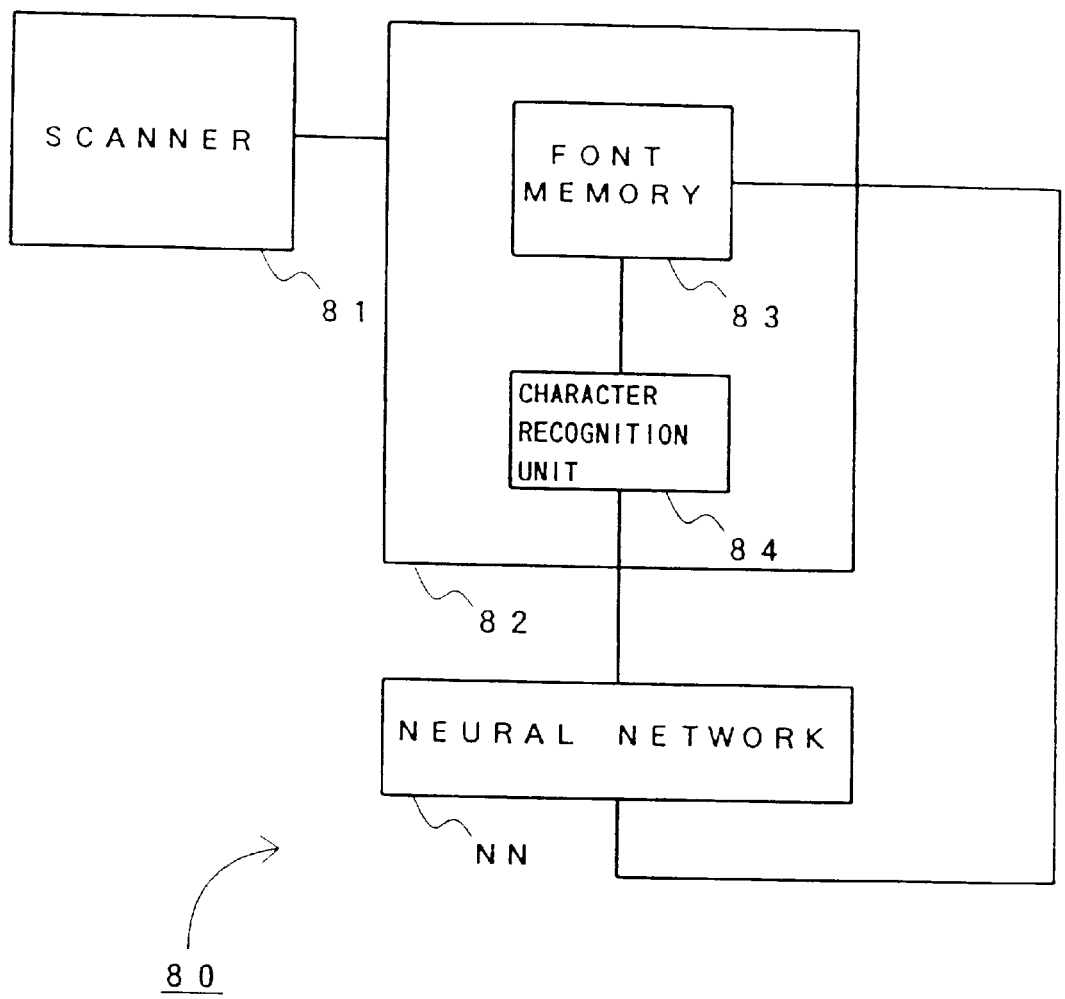

FIG. 39 is a block diagram of an optical character reader and the neural network system connected thereto.

DESCRIPTION OF THE PREFERRED EMBODIMENT

The present invention utilizes the neural networks and typical architecture and operation thereof will be described first for the purpose of facilitating understanding of the present invention.

As described above, the back propagation neural network is one of the most important and common neural network architecture, which is applied to the present invention. The hierarchical neural network architecture comprises at least two layers, an input layer and an output layer. It is possible to carry out neuroprocessing to some extent through the input and output layers. However, a hidden layer yields more effective neural networks. The hidden layer is connected to the input layer and output layer and is not directly connected to the outside world. Each layer consists of one or more nodes which are connected by links with variable weights. The network is trained by initially selecting small random weights and internal thresholds and then presenting all training data repeatedly. The weights are adjusted after every trial using side information specifying the correct result until the weights converge to an acceptable value.

Basic learning operation of the back propagation neural network occurs as follows. First, input patterns are supplied to the neural network to produce output patterns, each of which is compared with a correct or desired output pattern to obtain information indicating a difference between the actual and desired output patterns. The neural network adjusts the weights so as to reduce the difference therebetween. This process is continued until the network reaches a satisfactory level of performance. The neural network trained in the above-mentioned manner can produce an output pattern based on the input pattern even for an unknown input pattern.

Figure 1:
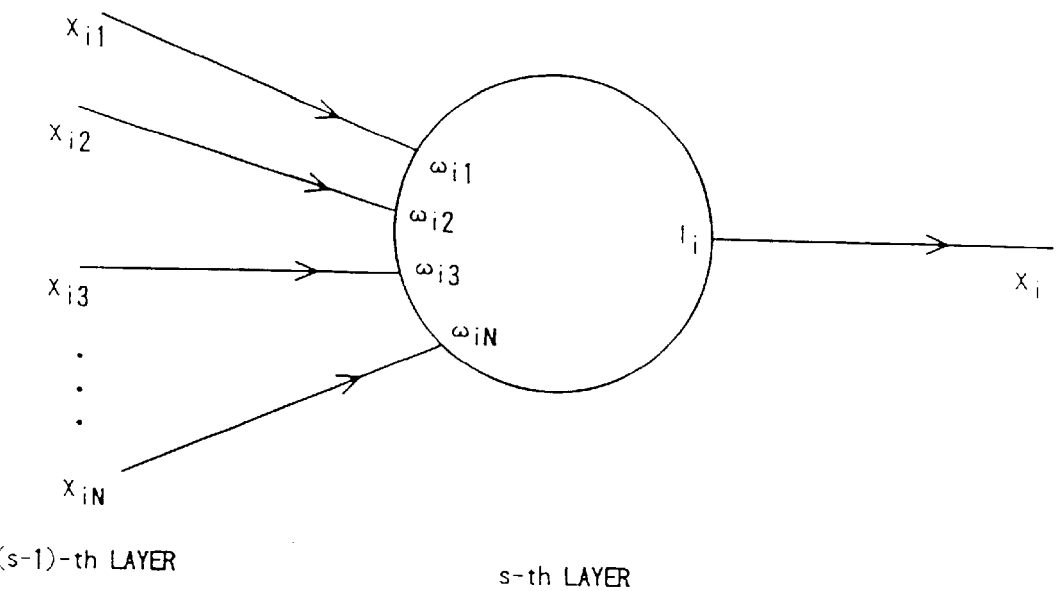
FIG. 1 is a view for use in describing incoming and outgoing data for a node of the neural network.

FIG. 1 is a view for use in describing incoming and outgoing data for a node of the neural networks. A node sums N weighted inputs and passes the result through a nonlinearity. The node is characterized by an internal threshold of offset q and by the type of nonlinearity. In FIG. 1, xij represents an output of a j-th node in an (s–1)-th layer (i.e., an i-th node in an s-th layer) and ωij represents a connection strength or a weight from the j-th node in the (s–1)-th layer to the i-th node in the s-th layer. As a result, a net input li to the i-th node in the s-th layer is obtained as follows:

$$li = \sum_{j=1}^{N} \omega ij\, lij + \theta \quad (1 \le j \le N). \tag{1}$$

Figure 2:
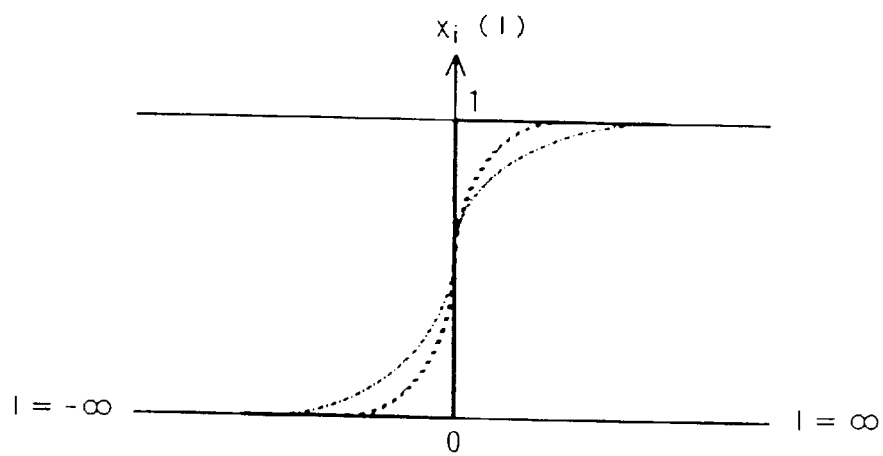
FIG. 2 is a graphical representation of sigmoid functions.

An output xi of the i-th node is obtained by using differentiable non-linearities which, in this case, is a logistic sigmoid function. As a result, $$xi = F(1, 1 + e - li) \tag{2}$$

can be obtained. A graphical representation of sigmoid functions is shown in FIG. 2. The sigmoid function will be described in more detail in conjunction with a description of teacher/input pattern generating operations.

Figure 3:
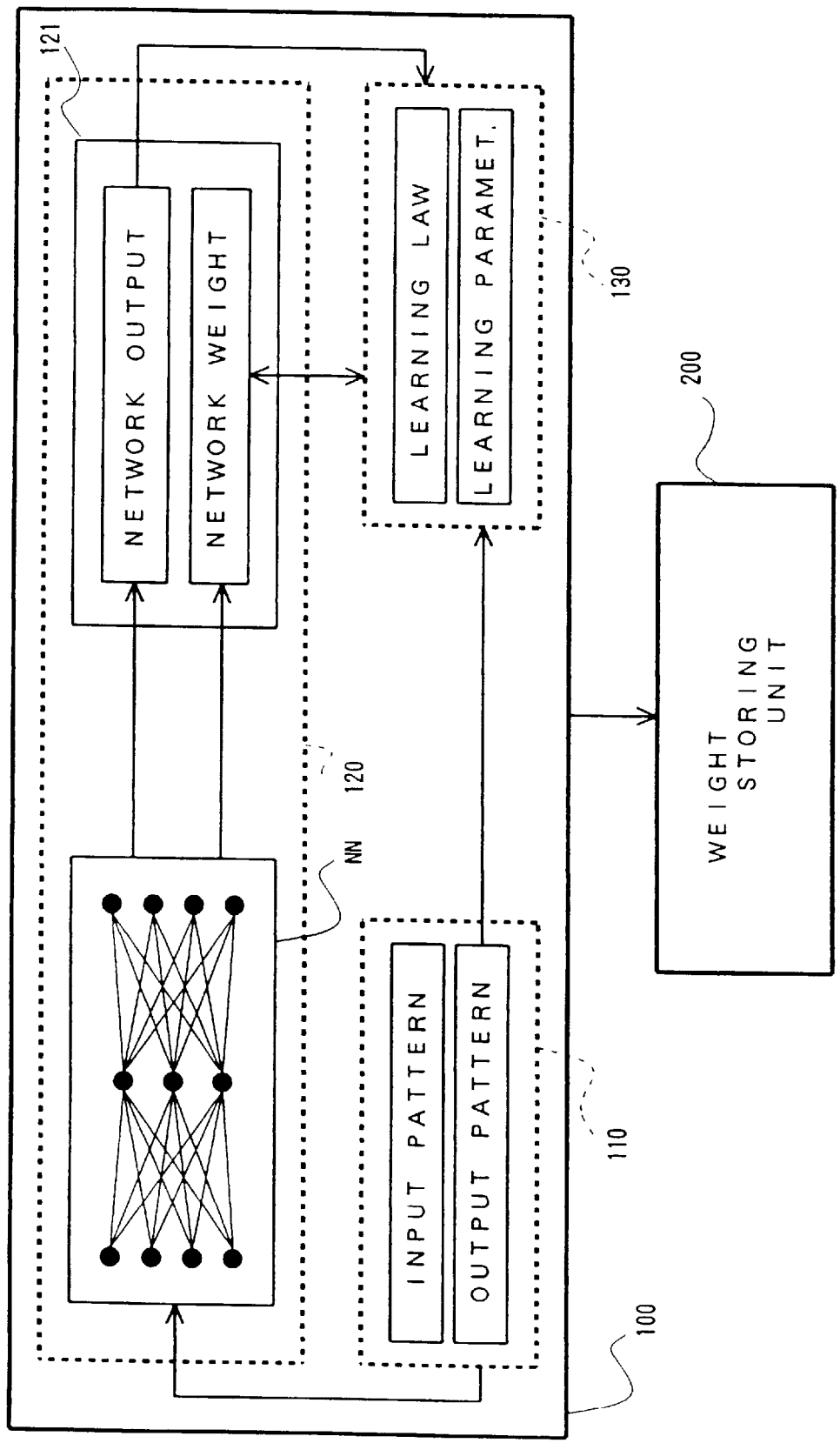
FIG. 3 is a block diagram showing an exemplified structure of the back propagation neural network, which is applicable to the present invention.
Figure 4:
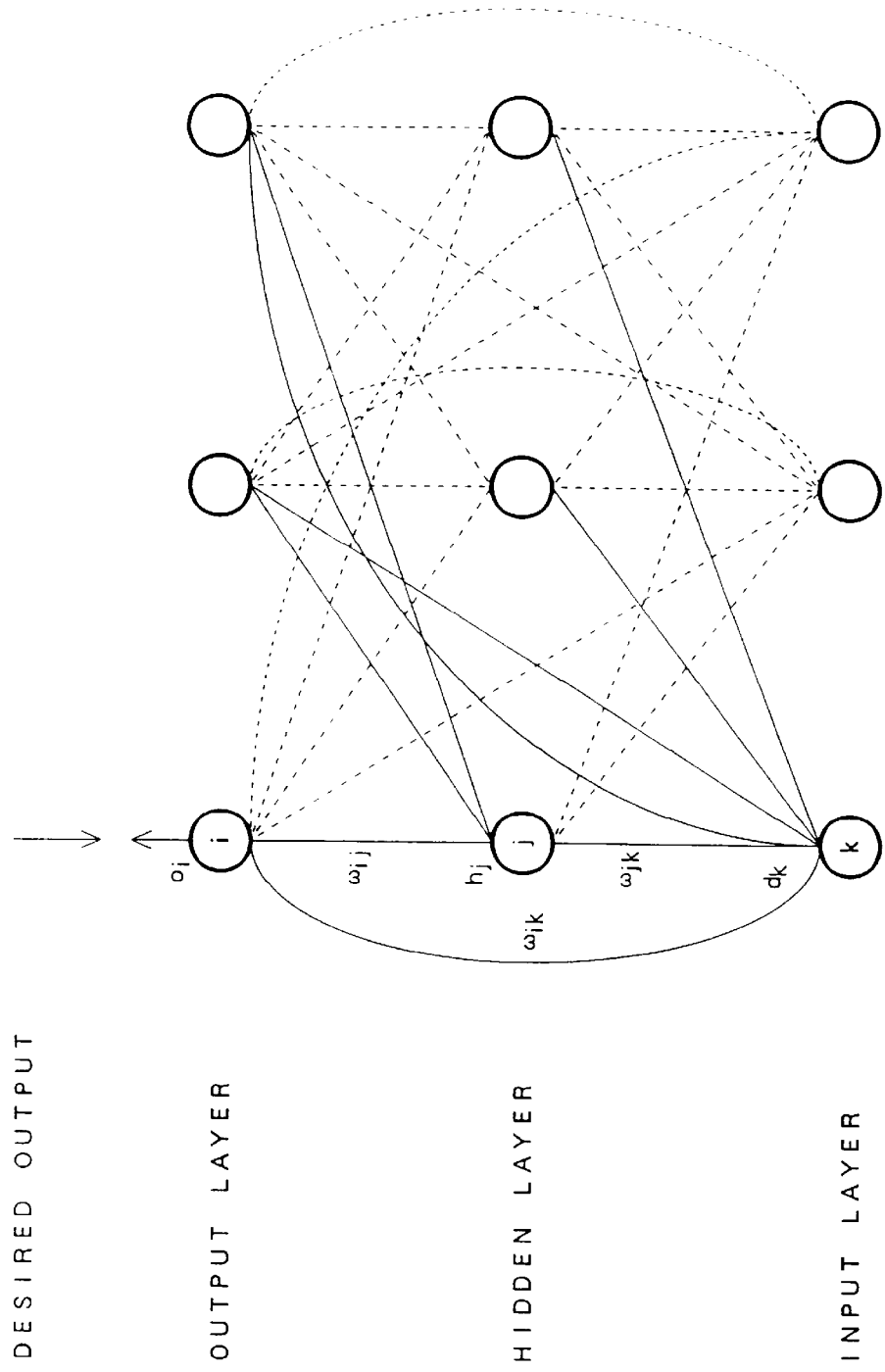
FIG. 4 shows an architecture and interaction of back propagation neural network nodes.

The back propagation neural network consisting of three layers is now described with reference to FIGS. 3 and 4. FIG. 3 is a block diagram showing an exemplified structure of the back propagation neural network, which is applicable to the present invention. In FIG. 3, the neural network comprises a learning unit 100 and a weight storing unit 200. The learning unit 100 further comprises a training pattern holding unit 110, a learning performance unit 120 and a learning parameter holding unit 130. The training pattern holding unit 110 holds the input patterns and the teacher patterns. The input patterns are supplied to the learning performance unit 120. The learning parameter holding unit 130 holds a learning law and learning parameters. The learning performance unit 120 further comprises a neural network unit NN and a weight updating unit 121. The weight updating unit 121 adjusts and updates the weight in accordance with the learning law and the learning parameters. The weight storing unit 200 is connected to the learning unit 100 to store the updated weight during training operation.

The learning performance unit 120 will further be described with reference to FIG. 4.

As mentioned above, the learning performance unit 120 comprises the neural network unit NN and the weight updating unit 121. The neural network unit NN is a multi-layered neural network as shown in FIG. 3. FIG. 4 shows an architecture and interaction of back propagation neural network nodes. Each node in the output layer is connected to every node in the hidden layer and the input layer. Each node in the hidden layer is connected to every node in the input layer. Each node in the input layer is supplied with input data from the outside. For example, if K is the number of nodes in the input layer and dk be an output of the k-th input node, an output h of each node in the hidden layer is as follows:

$$netj = \sum_{k=1}^{K} \omega jkdk + \theta j \quad (1 <= k <= K) \quad (1)',\quad (3)$$

then, $$hj = F(1, 1 + e^{-netj}) \quad (2),$$

where "net" represents a net input to a node.

Similarly, if J is the number of nodes in the input layer, an output o of each node in the output layer is as follows:

$$neti = \sum_{k=1}^{K} \omega jkdk \sum_{j=1}^{J} wijhj + \theta i \quad (1 \leq j \leq J), \quad (1)''$$

then, $$oi = F(1, 1 + e^{-neti}) \quad (2)''.$$

The weight updating unit 121 adjusts the weights so as to obtain a desired output of the network. If a pattern p is given, the difference between the actual output opi and the desired output (teacher pattern) tpi is represented by a mean square error therebetween. The mean square error Ep can be obtained as follows:

$$Ep = F(1, 2) \sum_{i} (tpi - opi)2. \quad (3)$$

During training operation, the weight updating unit 121 adjusts all weights to minimize a cost function δ equal to the mean square error Ep. A cost function δpi for each node in the output layer is given as follows:

$$\delta pi = (tpi - opi) opi (1 - opi) \quad (4).$$

Similarly, a cost function bpj for each node in the hidden layer is given as follows:

$$\delta pj = hpj(1 - hpj) \Sigma \delta pi\omega ij \quad (4)'.$$

The weight updating unit 121 enables the adjustment of the weight by back propagating the error towards the input layer. It is known in the art that the learning rate will be increased by adding an inertia term to the weight, namely:

$$\Delta \omega ij(n) = \eta \delta ixij + \alpha \Delta \omega ij(n-1) \quad (5),$$

where n represents the number of the training cycle and α represents a momentum (a learning rate constant).

The modification of the weight between the hidden layer and the output layer is given as follows:

$$\Delta \omega ij(n) = \eta \sum_{p} pihpj + \alpha \Delta \omega ij(n-1). \quad (5)'$$

and the modification of the weight between the input layer and the output layer is given as follows:

$$\Delta \omega ik(n) = \eta \sum_{p} \delta pidpk + \alpha \Delta \omega ik(n-1). \quad (5)''$$

Similarly, the modification of the weight between the input layer and the hidden layer is given as follows:

$$\Delta \omega jk(n) = \eta \sum_{p} \delta pjhpj + \alpha \Delta \omega jk(n-1). \quad (5)'''$$

Learning law for each layer can be given in accordance with the equations (4) and (5).

The above-mentioned back propagation neural network is a preferable type of network applied to the present invention. However, other neural networks of hierarchical design or other designs can be also applied to the present invention. For example, the Elman recurrent network of hierarchical design is available. The Elman recurrent network (not shown) consists of an input layer, a context layer, a hidden layer and an output layer. Each of the input, hidden and output layers has a single node. The output of the hidden layer is duplicated and fed back to a context layer. The context layer latches the data and the latched data is again supplied to the hidden layer. The output of the hidden layer at time t is duplicated and latched into the context layer. The output of the hidden layer at time t+1 is obtained with respect to the data supplied from both of the input layer and the context layer. Accordingly, the context layer holds a history of the previous input data.

Other available neural networks are those disclosed in, for example, Japanese Patent Unexamined Prepublication Nos. 228784/1990, 64788/1990 and 226382/1990. It is noted that these neural networks are only examples and not limited thereto. These prepublications are disclosed herein only as a reference.

Japanese Patent Unexamined Prepublication No. 228784/1990 discloses that a system comprises a neural network consisting of an assembly of analog neuroprocessors each of which receives an analog signal through an analog bus in a time divisional manner and carries out sum of product calculations to supply an analog signal to a second analog bus; a control pattern memory for storing a pattern of a control signal for controlling the neural network; a sequencer for controlling the neural network; a sequencer for generating addresses for the control pattern memory and a weight memory; the weight memory for storing weight information for each analog neuroprocessor; digital controller for controlling the neural network, the control pattern memory, the sequencer and the weight memory and for carrying out a training algorithm; and an input controller disposed in an input layer of the neural network for selecting either one of an input signal for use in carrying out the training algorithm supplied from the digital controller and an analog input signal supplied from an analog port.

Japanese Patent Unexamined Prepublication No. 64788/1990 discloses that an input means inputs an analog voltage to be outputted from the plural neuron models with being time-shared and multiplexed. A multiplier executes positive and negative switching by using an encoding bit of digital weighting data, which are inputted from an external part, for a time-sharing and multiplexing analog input signal. Further, the route of a current with weighting to be converted from the respective voltage values of the time-sharing and multiplexing analog signal is selected by the numerical value bit of the digital weighting data. Then, a product between the respective voltages of the time-sharing and multiplexing analog signals and the digital weighting data is generated. An adder means executes integration operation and a non-linear function generator forms a non-linear output function by the output of a sample-hold means. An output means outputs an analog output voltage, which is outputted to the neuron model in a rear step, with the time-sharing.

Japanese Patent Unexamined Prepublication No. 226382/1990 discloses that a dummy node means is connected to the analog bus of a neural network and generates a fixed voltage in the designated analog bus at the time of a test mode. A weight corrected means in a digital control means determines the intermediate weight of the weight to each neuroprocessor to be multipled with the fixed voltage, which is generated from the dummy node means in a second state at the time of the test mode, from the off-set voltage of each neuroprocessor and calculates the correct weight for the dummy node from the detected output voltage, which is outputted from the second analog bus, by using the gain. A weight memory stores the weight corrected by the weight correcting means. Thus, weight data for the dummy node are adjusted and the off-set or gain error can be absorbed.

Examples of schematical structure of the present invention, and following which preferred embodiments thereof, will now be described with reference to the drawing.

Figure 5:
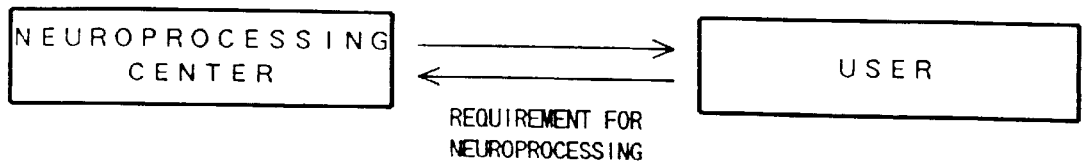
FIG. 5 is a block diagram for use in describing a basic operation of a neuroprocessing service system according to the present invention.

FIG. 5 is a block diagram for use in describing a basic operation of a neuroprocessing service system according to the present invention. A user can communicate with a neuroprocessing center through an adequate communication method. The user has a user terminal, which may be connected to the neuroprocessing center via a communication line, for processing and using a result of neuroprocessing carried out by the neuroprocessing center. The user terminal applicable to the present invention, may be a personal computer, a word processor or the like. When using a communication line to establish interconnection between the user terminal and the neuroprocessing center, the user terminal is required to have a communication function.

Figure 6:
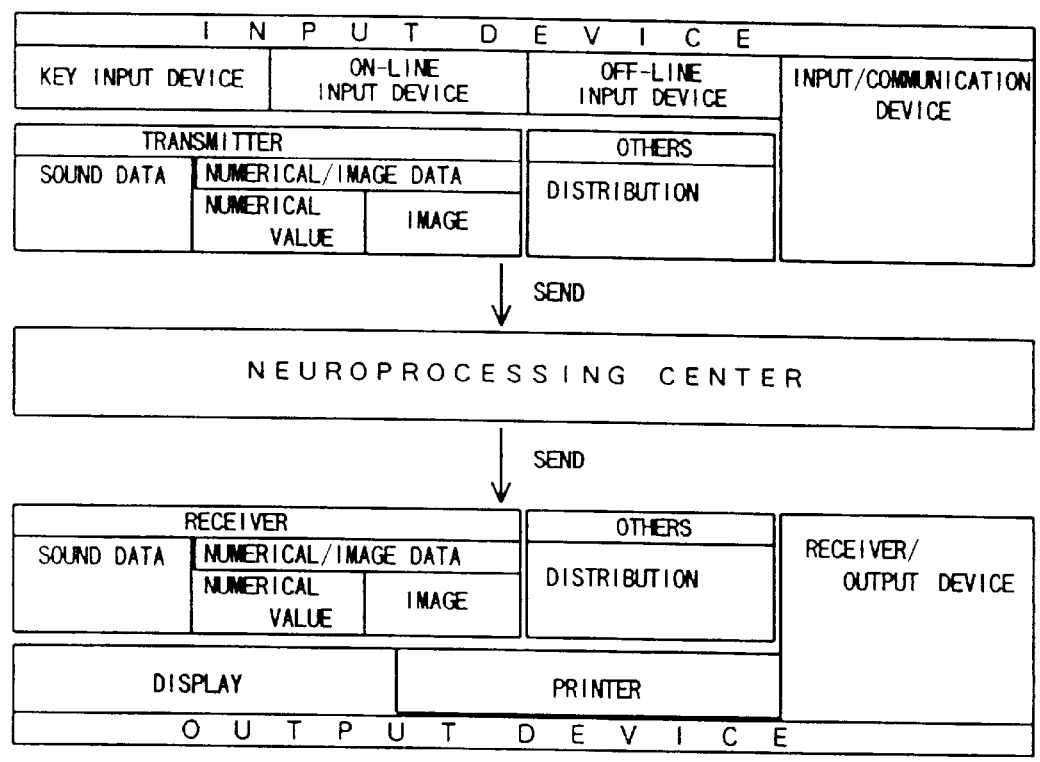
FIG. 6 is a schematical view of a neuroprocessing service system according to the present invention.

The user terminal comprises, as shown in FIG. 6, an input device such as a key input device (e.g., a keyboard and a touch screen), an on-line input device (e.g., a tablet and a mouse), an off-line input device (e.g., a scanner) or a facsimile device. These input devices are for use in supplying input data and teacher data to a neurocomputer in the neuroprocessing center.

The scanner is used to assist in the entry of data into a computer system. Image information obtained by the scanner may be sent to the neuroprocessing center either in the form of image data (dot data) or of a feature vector.

The movement of the mouse, a trackball and the keyboard sends electrical signals to the system unit which cause the cursor, or pointer, to move in a corresponding fashion. With these on-line input devices, the cursor can be moved very quickly. A light pen is used to pick-up or select information from the screen or tablet.

The tablet is a sensitized drawing area used in conjunction with the mouse or the light pen to input/manipulate data on the screen. A graphics tablet is a popular input device that consists of a flat drawing surface and some type of pointing device similar to a pen, that translates the motion into digital data. A pen, stylus, or hand-held cursor controller are used for drawing or writing a character. The stylus is expected to be widely used in the near future. All light pens contain a lens and a photodetector that senses the intensity of light emitted from a given point on the monitor screen. With an image processing device having an image pick-up device, an image of the original pattern or the modified pattern is picked-up through the image pick-up device such as a camera. The picked-up image is processed into a dot image data. The dot image data is then converted into a feature vector.

In addition, the user terminal preferably comprises an output device such as a display, a printer, plotter or a facsimile device. When the user terminal is connected to the neurocomputer via a communication line, it comprises a transmitter and a receiver as illustrated in FIG. 6. Examples of the transmitter/receiver are a telephone, a modem and an adapter for a facsimile device. However, the user may send data to the neuroprocessing center without using a communication line. In such a case, data stored in an adequate recording device such as a flexible disc may be sent to the neuroprocessing center by mail or by parcel.

With reference to FIG. 7, the neuroprocessing service system according to a first embodiment of the present invention will now be described. A user terminal 60 comprises an input unit 61, a computer unit 62, an output unit 63 and a cable/radio communication unit 64. The user terminal 60 is connected to a neuroprocessing center 50 via a communication line. The computer unit comprises a memory 70 for memorizing data supplied from the neuroprocessing center 50. The memory 70 may be a random access memory (RAM) where the resultant data obtained by the neuroprocessing is stored. It is possible to read out the data (the exclusive font for personal use) stored in the memory 70 and use the font in the same manner as predetermined fonts. The input unit 61 may be any one of the input devices such as a scanner, a keyboard, a mouse or so on.

FIG. 8 shows the neuroprocessing service system according to a second embodiment of the present invention. The neuroprocessing service system of this embodiment comprises similar parts designated by like reference numerals as in FIG. 7. Description of such parts will be omitted for the purpose of brevity. The user terminal 60 comprises an input or transmission unit 61', which in this embodiment is a facsimile device. With the facsimile device 61', it is possible to provide the more simplified service system.

On the other hand, a user can send data to the neuroprocessing center without using a communication line. In this case, the user employs a recording medium such as a magnetic recording medium (e.g., a flexible disc), an optical recording medium (e.g., an optical disc) or other recording medium. The recording medium storing data is transmitted between the user and the neuroprocessing center via mail or parcel.

FIG. 9 is a block diagram showing the neuroprocessing service system according to a third embodiment of the present invention. In FIG. 9, the user terminal 60 comprises similar parts designated by like reference numerals as FIG. 7. Therefore, description of such parts will be omitted. The user terminal 60 comprises an external recording input/output device 65 instead of the communication unit 64. The data is read out of and written into the recording medium in the external recording input/output device 65.

A neurocomputer for carrying out neuroprocessing generally has a neuroprocessing unit. The neuroprocessing unit has two substantial functions, i.e., learning and recognition. As well known in the art, a learning operation requires substantially more calculation than a recognition operation. In order to execute large amounts of calculations at relatively high speed, it is necessary to provide a neurocomputer comprising an hardware exclusive to the neuroprocessing. For example, the neuroprocessing center 50 where a large amount of data is processed requires a large-scale high-speed neurocomputer. The processing carried out in the neuroprocessing center 50 can be assigned to the user terminal to reduce the amount of processing in the center. In this event, the user terminal 60 carries out the processing which requires less calculation and less data at lower speed. For this purpose, the user terminal 60 may comprise a neuroprocessing unit therein.

FIG. 10 is a block diagram exemplifying a user terminal 60 having a neuroprocessing unit therein. In this figure, a user terminal 60 comprises an input unit; 61 such as a character data input device or a key input device a neurocomputer 62a; and an output unit 63 such as a display device or a printer. The neurocomputer 62a further comprises a memory unit 70, neuroprocessing unit 71, a central processing unit (CPU) 72, an input control unit 73 and an output control unit 74. Input data is supplied from the input unit 61 to the input control unit 73. The input control unit 73 is connected to the CPU 72 and, in turn, to the neuroprocessing unit 71. The CPU 72 is additionally connected to the memory unit 70 and the output control unit 74. The memory unit 70 comprises a font memory or a character memory which is not shown. The output control unit 74 is connected to the output unit 63. The neuroprocessing unit 71 carries out neuroprocessing in the manner described later.

If the user terminal 60 comprises the neurocomputer as illustrated in FIG. 10, the neuroprocessing can be assigned between the neuroprocessing center 50 and the user terminal 60 at various rates. FIGS. 11(a) and 11(b) are views for use in describing assignment of neuroprocessing, in which, FIG. 11(a) shows time charts representing an example of assignment for graphic pattern generating service and FIG. 11(b) shows a flow diagram corresponding to the time chart illustrated in FIG. 11(a). The processing carried out by the neuroprocessing center (i.e., crosshatching portions in FIG. 11(a)) is indicated in the flow chart with the same crosshatching.

In FIG. 11(a), a group 0 represents that all of the neuroprocessing is carried out in the user terminal.

A group 1 is classified into four cases, case 1-1 through case 1-4. In case 1-1, the user terminal supplies an image data of a hand-written character to the neuroprocessing center. The neuroprocessing center converts the image data into a feature vector as training pattern. More specifically, the neuroprocessing center takes a line segment from the hand-written character in the manner described below to produce a skeleton character consisting only of the line segments. The neuroprocessing center then picks up characteristics of the segments and carries out learning operation to produce a desired data. The resultant data is converted into either script data or a rasterized image data to be sent to the user terminal via a communication line or the like. The user terminal receives the script data or the rasterized image data through an output device.

In case 1-2, the user terminal carries out digitizing operation to supply a feature vector to the neuroprocessing center. The neuroprocessing center carries out the neuroprocessing operation to produce either the script data or the rasterized image data in a similar manner as that described in case 1-1. Case 1-3 shows that the training pattern is generated in the user terminal while case 1-4 shows that the learning operation is also carried out in the user terminal.

A group 2 is classified into four cases, case 2-1 through case 2-4. In this group, the neuroprocessing center supplies a result of the neuroprocessing as a vector data to the user terminal. The user terminal converts the vector data into either the script data or the rasterized image data.

A group 3 is classified into three cases or case 3-1 through case 3-3 where the neuroprocessing center supplies the result of learning to the user terminal. The neurocomputer in the user terminal carries out the neuroprocessing by using the result supplied from the center. The remaining operation is similar to those described in conjunction with the groups 1 and 2.

FIG. 12 is a schematic view for use in describing the operation of a graphic pattern generating system according to the present invention. The present invention is directed in general to provide service for automatically creating graphic patterns by using the neural networks. As shown in FIG. 12, a group of original patterns is supplied to the neural network as input patterns. A group of modified patterns prepared by modifying the corresponding original patterns is also supplied to the neural network as a teacher pattern. For example, an original pattern "A" and a modified pattern "A" are supplied to the neural network. The neural network learns the modification rule in the manner described above. The modification rule obtained by the learning is, in this example, 'to slant each character to the right at 30°'. After the neural network reaches a satisfactory level of performance, it can create desired outputs for an unknown graphic pattern. When the neural network is supplied with an original pattern "H", it automatically produces an output "H".

In the present invention, the original pattern (input pattern) and the modified pattern (teacher pattern) are supplied to the neural network in the form of image data or vector data. Accordingly, any one of the conventional input devices can be applied to the present invention to supply data to the network. In the neural network according to the present invention, strokes of a character are converted into feature vectors as an input pattern or a teacher pattern. Two methods for generating input and teacher patterns will be described below with reference to FIGS. 13 through 19.

<First Pattern Generating Method>

A graphic pattern such as a character is supplied to the neural network as vector data indicative of strokes of the pattern. In this event, each stroke is represented as a segment which consists of n continuous line segments as shown in FIGS. 13(a)–13(d). For example, each of the first through the fourth strokes illustrated in FIGS. 13(a)–13(d) comprises three line segments (a1, b1, and c1; a2, b2 and c2; . . . , respectively). The first method considers one stroke as one processing segment with which the neural network is trained.

In order to approximate a stroke consisting of a plurality of line segments in accordance with the polygonal line approximation technique, a first line segment (for example, a line segment a1) is specified based on coordinates of an initial point, a length and an angle. The angle is measured to a horizontal line including the coordinates of the initial point. The subsequent line segment (for example, a line segment b1) is specified based on its length and angle.

As shown in FIG. 14(a), the first line segment is specified with the coordinates X10 and Y10 of the initial point, the length L10 and the angle A10. The second line segment is specified with the length L11 and the angle A11. Similarly, all of the line segments other than the first line segment are specified with the length and the angle. The n-th line segment is thus specified with, as shown in FIG. 14(a), the length L1n and the angle A1n. The vector data indicative of the specified line segments are converted into feature vectors as an input pattern or a teacher pattern.

An example of the converted feature vector is shown in FIG. 14(b). With the first pattern generating method, the neural network architecture requires N input nodes and N output nodes where N is a positive integer which is equal to the number obtained by the following equation:

(the number of segments)×2+2.

More particularly, at least two input nodes are required to supply information for one line segment because the line segment is specified with the length and the angle. The remaining two nodes are for supplying information about the coordinates of the initial point, X10 and Y10, for the first line segment. As a result, if a stroke is represented by four line segments, the number of necessary input nodes is equal to ten (4×2+2). This is clearly shown in FIG. 15. As apparent from the above-mentioned description, the number of strokes is equal to that of the processing segments. In order to approximate each stroke into a plurality of lines, all vector data should be approximated at the same degree regardless of the length thereof. In other words, each stroke should be divided into line segments of the same number. In this event, a stroke can be mapped linearly, depending on its length, with the corresponding stroke.

As mentioned above, all data for the stroke correspond to the input and the output of the neural network and only one processing is required to produce desired stroke information accordingly.

<Second Pattern Generating Method>

Figure 16:
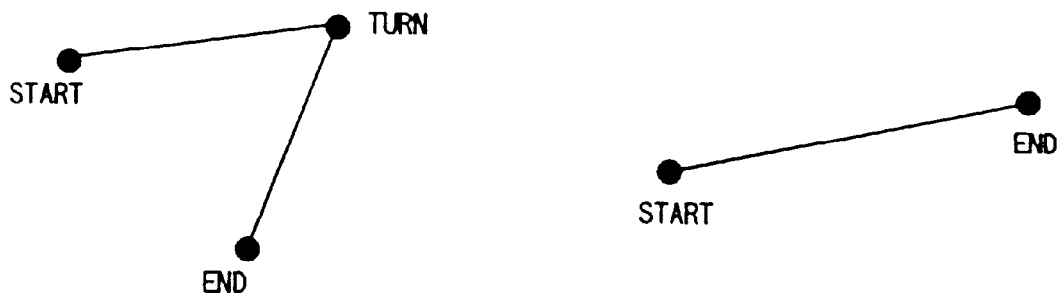
Figure 17:
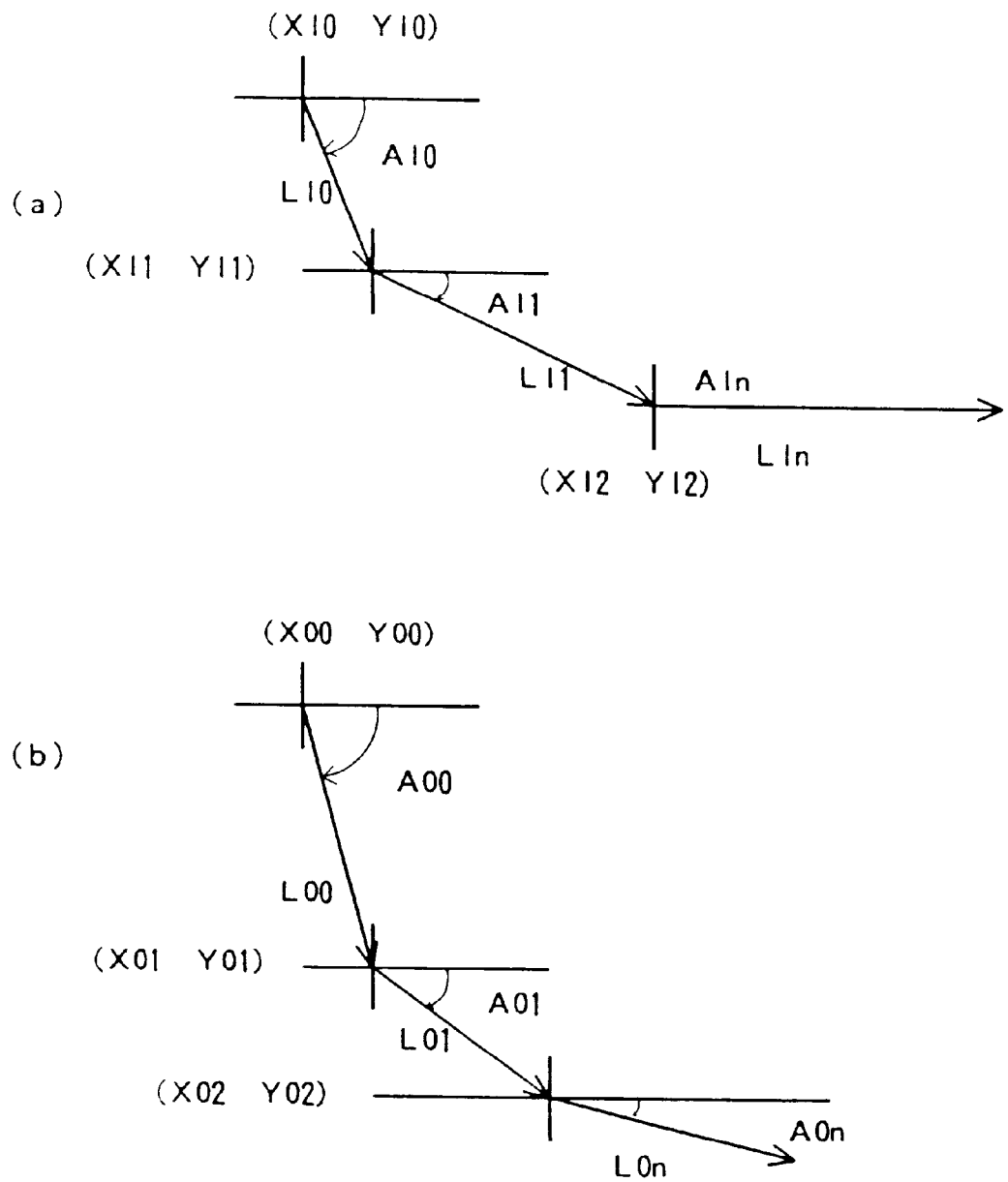

In this method, each line segment of a stroke is represented as a processing segment as shown in FIGS. 16(*a*) and 16(*b*). For example, the two strokes illustrated in FIGS. 16(*a*) and 16(*b*) consist of two line segments and one line segment, respectively. The second method considers one line segment as one processing segment with which the neural network is trained. In order to approximate a stroke consisting of a plurality of line segments in accordance with the polygonal line approximation technique, each line segment is specified based on coordinates of an initial point, length and angle. As shown in FIG. 17(*a*), the first line segment is specified with the coordinates Xl0 and Yl0 of the initial point, the length Ll0 and the angle Al0. The second line segment is specified with the coordinates Xl1 and Yl1 of the initial point, the length Ll1 and the angle Al1. Similarly, all of the line segments are specified with the length and the angle. The n-th line segment is thus specified with, as shown in FIG. 17(*a*), the length Ll*n* and the angle Al*n*. The vector data indicative of the specified line segments are converted into feature vectors as an input pattern or a teacher pattern. An example of the converted feature vector is shown in FIG. 17(*b*). In the second pattern generation method, the vector data for only one stroke is processed at one time. The neural network architecture requires N input nodes and N output nodes where N is a positive integer which is equal to the total number of the coordinates, the length and the angle for one stroke. In this example, one stroke is specified with the coordinates X and Y of the initial point, the length L and the angle A so that N is equal in number to four. This is clearly shown in FIG. 18. The second pattern generating method results in simplification of the neural network and the reduced processing time. It is, however, necessary to operate the neural network n times in order to produce desired stroke information where n represents a positive integer equal to the number of the line segments.

With the second pattern generating method, it is preferable to calculate the coordinates of the initial point of a subsequent stroke to be processed in accordance with the output indicative of information for the previous stroke. If, for example, the outputs corresponding to the input data X0, Y0, L0 and A0 are X1, Y1, L1 and A1 for the first stroke, coordinates X2 and Y2 of the initial point for the second stroke are preferably given by:

$$X2=X1+L1\times cos(A1),$$

and $$Y2=Y1+L1\times sin(A1) \quad (6).$$

Similarly, the outputs corresponding to the input data X2, Y2, L2 and A2 are X3, Y3, L3 and A3 for the first stroke, coordinates X4 and Y4 of the initial point for the third stroke are preferably given by:

$$X4=X3+L3¥ cos(A3),$$

and $$Y4=Y3+L3¥ sin(A3) \quad (6)'.$$

The above-mentioned first and second pattern generating methods are shown in comparison in Table 1 below. The advantage of each method to the pattern generation depends on the number of segments to be used for approximation and the performance of an operating machine where the pattern generating method is implemented. Thus, it is unnecessary to determine the superior one.

TABLE 1

| First Method | Second Method |
|---|---|
| Network Architecture | |
| Input layer: (# of segments) × 2 + 2 | Input layer: 4 |
| Hidden layer: Random (a) | Hidden layer: Random (b) |
| Connections | |
| {(# of segments) ¥2 + 2}+Random(a) | 4x (random + 1) + Random(b) ¥ (4 + 1) + Random × (# of segments)x2 + 2 |
| Operational Time for one Pattern | |
| Disadvantageous | Advantageous |
| (Large network) | (Small network) |
| One cycle time = T1 | One cycle time = T2 |
| Time for one stroke | |
| T1 | T2¥ (# of segments) |

: the number of

While two pattern generating methods have thus been described with some example thereof, other methods and techniques can also be applied for extracting features of the input and teacher patterns. Typical feature extraction methods are disclosed in, for example, Japanese Patent Unexamined Prepublication Nos. 92084/1987, 92089/1987, 164183/1987, 208191/1987 and 216092/1987.

Japanese Patent Unexamined Prepublication No. 92084/1987 discloses that a key point extracting input extracts plural key points for each stroke of characters, every character data from the character data belonging to the same type of the input characters. Then a relative position extracting means extracts the relative position relation between each pair of strokes of the relevant character for each character data and each key point based on the key point data obtained by the means. A relative position selecting input selects the type of the key point having the most stable position relation, as well as the relative position relation of the key point for each pair of strokes of character types, based on the data obtained by the means. In this way, the character features can be extracted with no error by extracting the features at the stable relative positions.

Japanese Patent Unexamined Prepublication No. 92089/1987 discloses that an input feature extracting means extracts the input features out of an input character pattern for each character stroke. While a character stroke order rearranging means divides the character strokes order rearranging means divides the character strokes of the input character pattern at every type of characters according to the prescribed decomposing procedure and rearranges the strokes in a prescribed stroke order. A collating means collates the input features extracted by the means with the standard features of each character type stored in the dictionary memory for each character stroke and according to the character stroke rearranging order decided by the means.

Thus, the character type of the input character pattern is decided. In this way, the character type of an input character pattern can be recognized with high accuracy regardless of the variance of the order of strokes or forms of characters.

Japanese Patent Unexamined Prepublication No. 164183/1987 discloses that an inter-stroke distance calculating means performs a distance calculation between an input pattern stroke data and a reference pattern stroke data, and generates an inter-stroke data and a reference pattern stroke data, and generates an inter-stroke distance matrix, and outputs it to a candidate stroke selecting means. The means generates the first corresponding candidate data, and outputs it to an inter-stroke relative position relation deciding means, and the means generates the second corresponding candidate data, and outputs it to a strokes corresponding means. The means, when one or a plural number of strokes which are decided as permissible by the data are present, corresponds one of the strokes to the stroke in the present reference pattern tentatively, and saves remainders at a stack means. Such operations are repeated until all of the strokes in the reference pattern have been corresponded. Thereby, the accurate correspondence can be performed.

Japanese Patent Unexamined Prepublication No. 208191/1987 discloses that a handwritten input character pattern on a tablet is compared with the dictionary patterns in a recognition dictionary by a candidate selecting circuit. The candidate selected by the circuit is inputted to a penalty setting circuit, the difference between the number of strokes of the input character and that of the proposed character is checked and a penalty is added to the difference between numbers of strokes. A stroke number sorting circuit sorts the proposed character based on the stroke number difference and the penalty; to determine the recognition order.

Japanese Patent Unexamined Prepublication No. 216092/1987 discloses that an input pattern expressed with a structure called DAG (directed acyclic graph) is stored in an input pattern storage part 1. Standard patterns expressed with the DAG structure are stored in a standard pattern storage part 2. In the DAG structure, feature points including end points of strokes and bending points are used as nodes and a pattern is expressed with a form of connection of a point of feature points transposed in accordance with the writing order. If there are plural feature points which should follow a certain feature point by the writing order, the standard pattern is stored as the structure where the node corresponding to the feature point is connected to plural nodes.

The neural network applied to the present invention learns the modification rules for graphic patterns. Two training methods can be used depending on the selected teacher patterns, both of which are described here.

<First Training Method>

Input Patterns Used: original patterns

Teacher Patterns Used: modified patterns obtained by modifying the original patterns First, a set A is prepared which includes a subset A0 consisting of a plurality of original patterns. The original patterns are represented in the electronic manner as, for example, the image data or the vector data. Subsequently, a set B is prepared which also includes a subset B0 consisting of a plurality of sample patterns. The sample patterns are obtained by means of modifying the corresponding original patterns. The modified patterns are also represented in the electronic manner. The neural network is supplied with the subset A0 as the input patterns. The modified patterns are also supplied to the neural network as teacher patterns. With these original and teacher patterns, the neural network learns the modification rule as network data. When the network reaches a satisfactory level of performance, the neural network can produce modified patterns for all of the remaining patterns in the set A.

<Second Training Method>

Input Patterns Used: original patterns

Teacher Patterns Used: differences between the original patterns and modified patterns First, a set A is prepared which includes a subset A0 consisting of a plurality of original patterns. The original patterns are represented in the electronic manner as, for example, the image data or the vector data. Subsequently, a set B is prepared which also includes a subset B0 consisting of a plurality of sample patterns. The sample patterns are obtained by modifying the corresponding original patterns. The modified patterns are also represented in the electronic manner. The neural network is supplied with the subset A0 as the input patterns.

A difference E between the original pattern and its corresponding modified pattern can be given as polynomial data obtained by a simple equation, $$E = B0 - A0 \qquad (7).$$

It is expected, however, E will exceed a predetermined range for the output layer of the neural network and the above-mentioned equation (7) can be applied only to the limited patterns. Accordingly, it is preferable to use the following equation, $$E = F(B0 - A0, 2) + C \qquad (8),$$

where $$C = F(up - low, 2) \qquad (9).$$

In the equation (9), "up" and "low" represent the upper and lower limits, respectively, of a sigmoid function illustrated in FIG. 2. When the input is not modified, the output can be given by the equation (9).

As well known in the art, the sigmoid function is assumed to rapidly approach fixed finite upper and lower limits asymptotically as its argument gets large and small, respectively, generally in the range between 0 and 1. As a result, C is equal to 0.5 in general. When using the second training method, the neural network should learn the difference between the original pattern and the teacher pattern. Thus, the teacher pattern is equal to $0.5 + \alpha$ except for some extremities. During initial loading, the weights in each node are set to zero and an initial output is expected to be equal to or around 0.5. This means that the weights converge during a short period of time because the weight on convergence is rather close to the initial value.

With the first training method, it is necessary to supply a large number of patterns to the network in order to reach a satisfactory level of performance. In contrast, the second training method requires smaller number of patterns for a more stable operation. Calculation for converting the output of the neural network into the desired output to be used becomes easier when the neural network is trained in accordance with the second training method. However, in order to train the neural network according to the second training method, it is necessary to modify network architecture slightly in such that the output of the neural network is supplied to a node in a post-processing layer. The node in the post-processing layer also receives the input corresponding to the received output. More specifically, the input is supplied to the input node as well as the post-processing node. In this event, the input is bypassed and supplied to the post-processing node.

Referring to FIGS. 19(a) and 19(b), 20 and 21(a) and 21(b), a method for reducing the time interval necessary for training the neural network until convergence of the weights will be described. In both FIGS. 19(a) and 19(b), the horizontal axis represents the number of training cycles while the vertical axis represents the number of patterns used. As mentioned above in conjunction with the second training method, a subset A0 is supplied to the neural network as the input patterns. In this event, the same subset A0 is first supplied thereto as the teacher patterns as shown in FIG. 19(b). No teacher patterns are variance with the input patterns because exactly the same patterns are used both as the input and teacher patterns. Under such circumstances, the weight is bound to converge with a lessor time interval of the training cycle. The weight obtained by the first training stage is used as an initial value of the weight for the subsequent learning stage. In the subsequent training stage, the neural network is supplied with the subset A0 as the input patterns and the subset B0 as the teacher patterns. Therefore, the network is able to learn the modification rule between A0 and B0.

In this manner, the training can be carried out in two stages (referred to as "two-stage training" hereinafter), in which the network architecture after the first stage is stored and used as the initial value for the second stage. This contributes to a reduced number of the training cycle in the second stage. As compared with a method for training the network (referred to as "single-stage training" hereinafter) shown in FIG. 19(a) where the subset B0 is used as the teacher patterns from the beginning of the training operation, this two-stage training requires less time to converge the weights. This is shown clearly in FIGS. 21(a) and 21(b).

The first training stage exhibits an energy space as indicated by a broken line in FIG. 20, where the weight is found on convergence at a point 1. The second training stage starts with the weight indicated by a point 2 and the weight converges at a point 3. As apparent from FIG. 20, the weight at point 2 converges earlier than that which is randomly selected (e.g., the weight indicated by a point 4). In addition, the first training stage requires a lesser number of teacher patterns, which results in the simplified energy space for earlier convergence. The number of training cycles for the above-mentioned two-stage training is compared with that of the single-stage training. The result of the comparison and an advantage of the two-stage training will be described with reference to FIG. 21.

In both FIGS. 21(a) and 21(b), the horizontal axis represents the number of presentations of the training to the set work while the vertical axis represents the mean square error, where FIG. 21(a) is for the single-stage training and FIG. 21(b) is for the two-stage training. In the two-stage training according to the present invention, training seven hundred and fifty-two times leads the weight to converge. This is less by far than the ten thousand and seven times in the single-stage training. The first training step is stopped at the two hundred and forty sixth training cycle and the second training step continues from the two hundred and forth-seventh to seven hundred and fifty-second training cycle.

The two-stage training method can be effective only in a case where the input patterns are supplied to the network with a control parameter because this method requires the following two conditions to be satisfied: (1) the first training step can be readily terminated with the weight converged, and (2) the data for the first training step is similar to that for the second training step (i.e., the energy space for the first training step is similar to that for the second training step). Setting of the control parameter will now be described.

The neural network preferably comprises a node for a control parameter other than the nodes for input and teacher patterns. The control parameter generally ranges from zero to one, both inclusive, only because the range of the sigmoid function ranges from zero to one. It is understood accordingly that the value itself of the control parameter has no meaning. A pattern indicated by the output is assumed to resemble the teacher pattern as the value of the control parameter approaches one, while the pattern is assumed to resemble the input pattern as the value of the control parameter approaches zero. Adjustment of the value of the control parameter may yield a large number of different outputs for one original pattern. For example, an output pattern between the input pattern and the teacher pattern can be obtained in the following manner. First, at least two pairs of the input pattern and the teacher pattern are prepared. In this event, the input patterns for each pair are exactly the same while the teacher patterns are different. During training with the first pair of patterns, the control parameter is set to any value X. During training with the second pair of patterns, the control parameter is set to another value Y. When an unknown pattern is supplied to the network, the control parameter is set to a value between X and Y to produce the output pattern between the input pattern and the teacher pattern. Of course, it is possible to provide neural network architecture which has two or more nodes for the control parameter.

The end patterns (e.g., the personal font) generated by the neural network are stored, as mentioned above, in the memory unit of the user terminal. A user may evaluate the personal font generated by the neurocomputer in the neuroprocessing center. If the user is not satisfied with the generated font, he may send back this font or data to the neuroprocessing center with a control parameter different from that used for the previous processing. For example, a user may require emphasis of the peculiarity of his characters, or may require remodification of the generated font into one similar to the original reference character. The degree of the requirement can be represented by a percentage. The user first indicates generation of the personal font with considering rates of the reference character set to twenty percent and the hand-written character eighty percent. If the generated font of the user's requirement is more similar to the reference font, the user may indicate re-modification thereof with the considering rate of the reference character set to forty percent.

It is possible to select the reference pattern as a combined character pattern of which shape is selected from the various fonts such as mincho, text style or gothic. It is also possible to use three or more fonts of character as the teacher pattern at any desired rate. For instance, the rate of mincho:gothic:hand-written character may be 2:4:4.

The standard data are normalized, a part of which may sometimes be equal between two or more of them. Some patterns may accordingly have the same input patterns depending on the training pattern generating method, particularly in the case of training character patterns. As shown in FIG. 22, when i ʃ and ā, are selected as the teacher patterns in order to establish a graphic pattern generating system by means of training the neural network with a hand-written character, the input patterns for both characters are the same because they have same left-hand radicals or 金. In contrast, there are no hand-written characters which are exactly the same even for the same character 金.

As a result, two or more different types of teacher patterns may be generated for identical input patterns, which leads to confusion in the neural network because the network cannot determine which pattern should be used as the teacher pattern. In such circumstances the weight will never converge and an extremely large number of cycles will be continued for endless training cycles. It is accordingly impossible for the network to determine when the training should be stopped. Such a problem tends to arise in the neural network system where a variety of graphic patterns are used for training.

In order to overcome the above-mentioned problem, when a set of input patterns having some common portions or equivalents exists, only one of them is selected as the teacher pattern to train the neural network. In this event, classification of input patterns can be made by calculating a similarity between two similar patterns in the manner well known in the art. The patterns within a predetermined value of similarity are classified into a same group, one of which is selected as the teacher pattern. For example, as shown in FIG. 23, patterns P1, P2 and P9 are classified into a group G1 and patterns P5 and P10 are classified into a group G2. It is noted here that the ordinate and the abscissa are only for representing distribution of the patterns. For training, one of the patterns is selected from each of the group G1 and the group G2.

The above-mentioned "classification method" can also be applied to a sound synthesizing system using the neural networks. Utterance for one character differs slightly from person to person, e.g., utterance for a character "a" may, for example, be [æ] or [a], etc. In this case, one teacher pattern is selected from a group consisting of different utterance patterns for one character "a".

In order to further clarify the features and advantages of the present invention, some examples are shown hereinafter. As an example, description will be made regarding graphic pattern generating service.

EXAMPLE 1

Mr. T and Mr. Y were asked to write some characters in a desired shape. These characters were supplied to the neural network as the teacher patterns. After completion of training, unknown original characters were supplied to the network to produce modified characters therefor. Patterns used and results of this test are shown in FIGS. 24 through 28.

Input patterns and teacher patterns were prepared in accordance with the above-mentioned second pattern generating method. Characters used are: 国田固亜弟自.

As described in conjunction with FIG. 17(a), an original character was approximated into a polygonal line consisting of a plurality of continuous line segments. A first line segment is specified with the coordinates Xl0 and Yl0 of the initial point, the length Ll0 and the angle Al0. The second line segment is specified with the coordinates Xl1 and Yl1 of the initial point, the length Ll1 and the angle Al1. Similarly, all of the line segments are specified with the coordinates of the initial point, the length and the angle. The n-th line segment is thus specified with, as shown in FIG. 17, the coordinates Xl$n$ and Yl$n$ of the initial point, the length Ll$n$ and the angle Al$n$.

Next, Mr. T and Mr. Y were asked to write the characters 国田固亜弟自 by hand as shown in FIGS. 24 and 25. These hand-written characters were also approximated into polygonal lines to produce vector data. More particularly, a first line segment is specified with the coordinates XO0 and YO0 of the initial point, the length LO0 and the angle AO0. The second line segment is specified with the coordinates XO1 and YO1 of the initial point, the length LO1 and the angle AO1. Similarly, all of the line segments are specified with the coordinates of the initial point, the length and the angle. The n-th line segment is thus specified with the coordinates XO$n$ and YO$n$ of the initial point, the length LO$n$ and the angle AO$n$.

The neural network and learning conditions used are as follows.

| Network Architecture: | nodes = (554) |
| --- | --- |
| | 5 Input nodes (4 nodes for input data and 1 for control parameters) |
| | 5 Hidden nodes |
| | 4 output nodes |
| Learning coefficients: | epsilon = (5.000000 1.000000) |
| | alpha = (0.800000 0.300000) |
| Allowable learning error: | allowance = 0.01 |
| Maximum training cycle: | iteration = 10,000 |
| Random seed: | random seed = 5 |
| Initial values: | weight = random (0.5–0.01 0.01) |
| | threshold = random (0.5–0.01 0.01) |

A set of modified characters were used as the teacher patterns in accordance with the above-mentioned first training method. Thus, a feature vector indicative of (Xl0, Yl0, Ll0 and Al0) is supplied to the network as the input pattern and a feature vector indicative of (XO0, YO0, LO0 and AO0) is supplied thereto as the teacher pattern. This is continued up to the n-th pattern represented by (Hl$n$, Yl$n$, Ll$n$ and Al$n$) and (XO$n$, YO$n$, LO$n$ and AO$n$). During training, the neural network learned the following two modification rules for each of 国田固亜弟自.

Original character→Original character (control parameter of 0)

Original character→Modified character (control parameter of 1)

As mentioned above, the neural network learned "Original character→Original character (control parameter of 0)" to produce median outputs. Examples of teacher patterns (which are exactly the same as the input patterns) are shown in FIG. 29.

In the neural network of the above-mentioned network architecture, the weight did not converge and training was stopped at the maximum training cycle, i.e., ten thousand times. At the end of training, the maximum mean square error and the mean error for Mr. T were 0.005320 and 0.000419, respectively, while the maximum mean square error and the mean error for Mr. Y were 0.007625 and 0.000623, respectively.

When the neural network reached a satisfactory level of performance, three unknown characters, 回 中 首, were supplied to test the network. The results thereof are shown in FIG. 26 through 28. The control parameter for each character was varied between 0.000000 and 1.000000 by every 0.200000, as represented by c para=??????? in the figures. The results show that the control parameter approximating to one yields a character similar to the hand-written character while the control parameter approximating to zero yields a character similar to the original character.

It is noted that, during training operation, the coordinates of the initial point of the second stroke were calculated in accordance with the above-mentioned equations (6) and (6)'. The coordinates X and Y of the initial point of one stroke are equal to those of other strokes, respectively, and the end character is quite natural in shape as shown in FIG. 30(b) compared with a character shown in FIG. 30(a). The character shown in FIG. 30(a) is a result of learning by the network with the architecture and conditions similar to those disclosed above in conjunction with the example 1 except that pattern generation used is the above-mentioned first pattern generating method. Without considering the coordinates of an initial point of a previous stroke, the resultant character may be formed with some line segments which should be connected or crossed but not actually as shown in FIG. 30(c).

EXAMPLE 2

In this example, character fonts were also automatically generated in the same manner as described in conjunction with the example 1 except for the following conditions.

The neural network and learning conditions used are as follows.

| Network Structure: | nodes = (524) |
| --- | --- |
| | 5 Input nodes (4 nodes for input data and 1 for control parameters) |
| | 2 Hidden nodes |
| | 4 Output nodes |
| Learning coefficients: | epsilon = (5.000000 1.000000) |
| | alpha = (0.800000 0.300000) |
| Allowable learning error: | allowance = 0.01 |
| Maximum training cycle: | iteration = 5,000 |
| Random seed:. | random seed = 5 |
| Initial values: | weight = random (0.2–0.01 0.01) |
| | threshold = random (0.2–0.01 0.01) |

Four alphabets "A", "T", "H" and "M" shown in FIGS. 31 and 32 were used as the input and teacher patterns to learn the following modification rules.

Original character→Original character (control parameter of 0)

Original character→Modified character (control parameter of 1)

When the neural network reached a satisfactory level of performance, four unknown character, "K", "E", "I", and "L", were supplied to the network. The results thereof are shown in FIGS. 33 through 36. The control parameter for each character was varied between 0.000000 and 1.0000000 by every 0.200000. The results show that the control parameter approximating to one yields a character similar to the hand-written character while the control parameter approximating to zero yields a character similar to the original character.

EXAMPLE 3

This example is a case where a difference between the input pattern and the teacher pattern is used as the teacher pattern. As mentioned above, the neural network architecture should be modified slightly for learning the modification rule from the difference. The difference between the original pattern and teacher pattern can be given in accordance with the equations (8) and (9). In this event, operation is made on the basis of the following equation, $$O = F(T-I, R) + C \tag{10}$$

where O represents an actual output of the neural network, T represents a desired output, I represents an input for the neural network, R represents a conversion rate and C represents a constant. Thus, the desired output T of the network can be given by:

$$T = I + (O-C)/R \tag{11}$$

The architecture of the network is modified for producing the desired output T. The output of the network is shown in FIG. 37(b) in comparison with the output (FIG. 37(a)) obtained in accordance with the first training method.

While the preferred embodiments of the present invention have thus been described in conjunction with the graphic pattern generating service through a neuroprocessing center, it is to be understood that other services can be provided by the neuroprocessing center. Basic operation of the present invention is described now with reference to FIG. 38, and some other examples of the neuroprocessing service are shown.

In FIG. 38, vector data of an original pattern or reference pattern (set A0) is supplied to the neural network at step 101. The original pattern may be a standard character pattern for the font generating service, whereas it may be a predetermined sound message for voice message generating service. At step 102, vector data of a teacher pattern (set B0) is supplied to the network. In this event, the teacher pattern may be a modified character pattern for the font generating service. Another example of the teacher pattern is a voice of a particular individual and so on. Step 103 learns a modification rule between the reference pattern and the teacher pattern. The modification rule can be obtained at step 103' by calculating a difference between the reference pattern and the teacher pattern. Step 104 determines whether the weights of the network converge. If the step 104 is affirmative, control passes to step 107, while, if the step 104 is negative, control passes to step 106. The step 106 determines whether learning operation should be stopped. When the step 106 is negative, processing is repeated from the step 101. On the other hand, a positive result at the step 106 continues to the step 107. At the step 107, vector data of an unknown pattern (set A) is supplied to the neural network. Subsequent step 108 modifies the unknown pattern in accordance with the modification rule. Finally, step 109 produces the modified pattern (set B) for the unknown pattern. In this event, the modified pattern may be a personal font for a word processor, a synthesized message voice and so on.

The present invention is also applicable to an optical character reader (OCR) as shown in FIG. 39. The OCR has been used as a character input device in recent years in spite of its rather low recognition rate. An optical character reader 80 comprises a scanner 81, and a character recognition system 82. The character recognition system comprises a font memory 83 and a character recognition unit 84. The font memory 83 contains a predetermined font, while the character recognition unit 84 compares a picked-up data of a character with a character of the stored font. When a character to be read is quite similar in shape to that stored in the memory, the OCR enables recognition of the character. A hand-written character is, however, rarely read by the OCR. Such an unrecognizable character is used as a teacher pattern to generate a complete step of characters (font) through the neuroprocessing service according to the present invention. The unrecognizable pattern is sent to the neural network NN in an adequate manner. Once the unrecognizable character is made as a font, it becomes possible to store the font in the font memory of the OCR. As a result of storing the font of the hand-written characters, the OCR can recognize any other hand-written characters written by the same person.

As the present invention may be embodied in several forms without departing from the spirit of essential characteristics thereof, it is to be understood that the invention is not limited to the services described above. The scope of the invention, therefore, is to be determined solely by the following claims.

What is claimed is:

1. A pattern modification method, comprising:
   (a) providing a set A formed of original patterns;
   (b) inputting to a neural network, a subset A0 of the set A and a subset B0 having elements corresponding to the subset A0 from a set B formed of modified patterns obtained by applying an unknown modification rule to the original patterns in the set A;
   (c) learning the unknown modification rule in the neural network from the subset A0 as input patterns and the subset B0 as teacher patterns; and
   (d) generating the set B of modified patterns with the neural network which has learned the unknown modification rule.

2. A pattern modification method achieved by the neural network as claimed in claim 1, wherein a set of desired patterns is used as a teacher pattern to train said neural network.

3. A pattern modification method achieved by the neural network as claimed in claim 1, wherein a difference between a set of desired patterns and a set of original patterns is used as a teacher pattern to train said neural network.

4. A pattern modification method achieved by the neural network as claimed in claim 1, wherein said neural network receives said input pattern and a control parameter for obtaining various output patterns.

5. A pattern modification method achieved by the neural network as claimed in claim 4,
   wherein the neural network is previously trained with the input pattern, including said subset A0, said control parameter and the teacher pattern, including said subset A0 as in said input pattern, and
   wherein a weight obtained as a result of previous training is used as an initial value for training the neural network with said input pattern including said subset A0 and the teacher pattern including said subset B0.

6. A pattern modification method achieved by the neural network as claimed in claim 1, wherein a graphic pattern is supplied to the neural network as vector data indicative of strokes of said graphic pattern and each stroke is represented as a segment which consists of n continuous line segments, one stroke is considered as one processing segment, said neural network is trained with said vector data used as the input pattern and the teacher pattern for said neural network, thereby converting said strokes of characters.

7. A pattern modification method achieved by the neural network as claimed in claim 1, wherein a graphic pattern is supplied to the neural network as vector data indicative of strokes of said graphic pattern and each line segment of a stroke is represented as a processing segment which is considered as a pattern data sequence indicative of n line segments, said neural network is trained with each of said vector data for said line segment, thereby entire strokes consisting of n strokes can be converted.

8. A pattern modification method achieved by the neural network as claimed in claim 8, wherein when there are a set of input patterns having some common portions of equivalents, only one of the input patterns is selected as the teacher pattern to train said neural network.

9. A pattern modification method achieved by the neural network as claimed in claim 8, wherein said input patterns are compared with each other to calculate a distance between two input patterns and selected input patterns within a predetermined range of distance are classified into one group, only one of which is selected as the teacher pattern to train said neural network.

10. A pattern modification apparatus comprising:
    a neural network to use a set A formed of original patterns to generate a set B of modified patterns;
    a training unit to train said neural network by inputting to said neural network, a subset A0 of the set A as input patterns and a subset B0 of the set B as teacher patterns, where the subset B0 is obtained by externally applying an unknown modification rule to the original patterns in the subset A0, until the unknown modification rule is learned by said neural network; and
    a pattern generation unit to generate the set B of modified patterns by supplying the set A to said neural network as the input patterns after said neural network has learned the unknown modification rule by training with subsets A0 and B0.

11. A pattern modification apparatus as claimed in claim 10, wherein the set B is a set of desired patterns including the subset B0 used as the teacher patterns to train said neural network.

12. A pattern modification apparatus as claimed in claim 10, wherein the subset B0 is a difference between a set C of desired patterns and the subset A0 of the set A of original patterns.

13. A pattern modification apparatus as claimed in claim 10, wherein said neural network receives the subset A0 as the input patterns and a control parameter for obtaining various output patterns.

14. A pattern modification apparatus as claimed in claim 13,
    wherein said neural network is trained previously by said training unit using the control parameter and the subset A0 as both the input patterns and the teacher patterns, to obtain weights for said neural network, and
    wherein said training unit uses the weights obtained as a result of the training previously as initial values for training said neural network with the subset A0 as the input patterns and the subset B0 as the teacher patterns.

15. A pattern modification apparatus as claimed in claim 10,
    wherein said neural network receives and outputs vector data indicative of strokes of graphic patterns, each stroke corresponding to one processing segment consisting of n continuous line segments,
    wherein the set A represents a first group of graphic patterns, and the set B represents a second group of graphic patterns, and
    wherein after said neural network is trained with the subset A0 as the input patterns and the subset B0 as the teacher patterns, input of the set A results in the strokes of the first group of graphic patterns being converted into the strokes of the second group of graphic patterns.

16. A pattern modification apparatus as claimed in claim 10,
    wherein said neural network processes strokes forming graphic patterns, each represented as a pattern data sequence,
    wherein said neural network receives and outputs vector data indicative of one line segment included in one stroke of one graphic pattern at a time, each line segment corresponding to a processing segment,
    wherein the set A represents a first group of graphic patterns, and the set B represents a second group of graphic patterns, and wherein after said neural network is trained, one line segment at a time, with the subset A0 as the input patterns and the subset B0 as the teacher patterns, input of the set A results in the strokes of the first group of graphic patterns being converted into the strokes of the second group of graphic patterns.

17. A pattern modification apparatus as claimed in claim 10, wherein at least one of the teacher patterns in subset B0 is selected from a group of patterns in set B having some common portions or equivalents.

18. A pattern modification apparatus as claimed in claim 10,
   wherein original patterns are compared with each other to calculate a difference between pairs of the original patterns, and
   wherein at least one of the input patterns in subset A0 is selected from a group of patterns in set A all having differences from each other less than a predetermined amount.

19. An automated pattern modification method for generating a set B of modified patterns from a set A of original patterns, comprising:
   training a neural network to learn an unknown modification rule by inputting a subset A0 of the set A as at least one input pattern and a subset B0 of the set B as at least one teacher pattern, where the subset B0 is obtained by externally applying the unknown modification rule to each of the at least one original pattern in the subset A0, until substantial convergence of the input and teacher patterns; and
   generating the set B of modified patterns by inputting the set A as unknown input patterns to the neural network after the neural network has learned the unknown modification rule.

* * * * *

UNITED STATES PATENT AND TRADEMARK OFFICE
CERTIFICATE OF CORRECTION

PATENT NO.:     5,999,922
DATED      :     December 7, 1999
INVENTOR(S):    Takehiko TANAKA, et al.

It is certified that error appears in the above-identified patent and that said Letters Patent is hereby corrected as shown below:

In the Claims:

Column 23,   Line 59,   change "8" to --1--.

Signed and Sealed this

Thirteenth Day of June, 2000

Attest:

Q. TODD DICKINSON

Attesting Officer                    Director of Patents and Trademarks